(12) United States Patent
Goebel et al.

(10) Patent No.: US 8,855,861 B2
(45) Date of Patent: Oct. 7, 2014

(54) VEHICLE DRIVE CONTROL SYSTEMS AND THE RELATED VEHICLES

(71) Applicants: Michael Goebel, Seven Hills, OH (US); Derek Kaesgen, Moreland Hills, OH (US)

(72) Inventors: Michael Goebel, Seven Hills, OH (US); Derek Kaesgen, Moreland Hills, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 13/841,061

(22) Filed: Mar. 15, 2013

(65) Prior Publication Data

US 2013/0282214 A1 Oct. 24, 2013

Related U.S. Application Data

(63) Continuation of application No. 13/657,855, filed on Oct. 22, 2012.

(60) Provisional application No. 61/637,838, filed on Apr. 24, 2012, provisional application No. 61/637,842, filed on Apr. 24, 2012, provisional application No. 61/656,943, filed on Jun. 7, 2012.

(51) Int. Cl.
| | |
|---|---|
| *A01B 69/00* | (2006.01) |
| *G05D 1/00* | (2006.01) |
| *B62D 6/00* | (2006.01) |
| *B62D 11/00* | (2006.01) |
| *B62D 11/24* | (2006.01) |

(52) U.S. Cl.
CPC .............. *B62D 6/001* (2013.01); *B62D 11/003* (2013.01); *B62D 11/24* (2013.01)
USPC ................................... 701/41; 701/50; 701/93

(58) Field of Classification Search
CPC ...... B62D 11/006; B62D 3/12; B62D 15/023; A01D 69/02; A01D 34/006; B60K 7/0007; B60Y 2200/223
USPC ................................................ 701/41, 50, 93
See application file for complete search history.

(56) References Cited

U.S. PATENT DOCUMENTS

| | | | |
|---|---|---|---|
| 3,563,327 A | 2/1971 | Mier | 180/169 |
| 3,627,070 A | 12/1971 | Colten | 180/6.48 |

(Continued)

FOREIGN PATENT DOCUMENTS

| | | |
|---|---|---|
| DE | 3744419 | 11/1989 |
| EP | 1 201 488 | 3/2008 |

(Continued)

OTHER PUBLICATIONS

Steering Dynamics, Jan. 27, 2008, ETH Zurich University, retrieved from http://www.idsc.ethz.ch/Courses/vehicle_dynamics_and_design/11_0_0_Steering_Theroy.pdf on Apr. 8, 2014.*

(Continued)

*Primary Examiner* — Calvin Cheung
*Assistant Examiner* — Thomas Ingram
(74) *Attorney, Agent, or Firm* — Fulbright & Jaworski LLP

(57) ABSTRACT

Vehicle control systems that can be used, for example, to configure a vehicle (e.g., a lawn tractor or riding lawn mower) to make low- to substantially zero-radius turns. Some of the present vehicle control systems utilize at least one steered wheel position sensor to generate a signal that indicates the actual position of the steerable structure (e.g., wheel) to which the sensor is coupled, rather than a projected or anticipated position of that steerable structure. Vehicles that include such control systems.

20 Claims, 16 Drawing Sheets

(56) References Cited

U.S. PATENT DOCUMENTS

| | | | |
|---|---|---|---|
| 3,726,094 A | 4/1973 | Schaefer | 60/488 |
| 3,771,310 A | 11/1973 | Cryder | 60/445 |
| 3,803,841 A | 4/1974 | Erickson et al. | 60/421 |
| 3,841,423 A | 10/1974 | Holtkamp et al. | 180/6.3 |
| 3,848,690 A | 11/1974 | Hawkins | 180/6.48 |
| 3,916,625 A | 11/1975 | Holtkamp | 60/421 |
| 3,987,626 A | 10/1976 | Bianchetta | 60/445 |
| 4,191,270 A | 3/1980 | Monteith | 180/53.4 |
| 4,354,568 A | 10/1982 | Griesenbrock | 180/197 |
| 4,553,620 A | 11/1985 | Eckhardt et al. | 180/6.48 |
| 4,823,899 A | 4/1989 | Ron | 180/411 |
| 4,914,592 A | 4/1990 | Callahan et al. | 701/41 |
| 5,249,422 A | 10/1993 | Smith et al. | 60/426 |
| 5,417,299 A | 5/1995 | Pillar et al. | 180/412 |
| 5,433,066 A | 7/1995 | Wenzel et al. | 56/14.7 |
| 5,456,333 A | 10/1995 | Brandt et al. | 180/336 |
| 5,607,028 A | 3/1997 | Braun et al. | 180/408 |
| 5,793,422 A | 8/1998 | Mochizuki et al. | 348/296 |
| 6,082,084 A | 7/2000 | Reimers et al. | 56/11.9 |
| 6,082,742 A | 7/2000 | Ishikawa | 280/5.508 |
| 6,089,341 A | 7/2000 | Gingerich | 180/65.1 |
| 6,152,248 A | 11/2000 | Hidaka et al. | 180/6.38 |
| 6,293,022 B1 * | 9/2001 | Chino et al. | 33/203.18 |
| 6,456,925 B1 * | 9/2002 | Romig | 701/93 |
| 6,564,481 B2 | 5/2003 | Wakitani et al. | 37/348 |
| 6,591,593 B1 | 7/2003 | Brandon et al. | 56/10.6 |
| 6,805,218 B2 | 10/2004 | Wakitani et al. | 180/315 |
| 6,808,032 B2 | 10/2004 | Wuertz et al. | 180/6.48 |
| 6,827,174 B2 | 12/2004 | Chernoff et al. | 180/333 |
| 6,843,046 B2 | 1/2005 | Heidjann et al. | 56/208 |
| 6,857,253 B2 | 2/2005 | Reimers et al. | 56/10.6 |
| 6,880,855 B2 | 4/2005 | Chernoff et al. | 280/778 |
| 6,898,496 B2 | 5/2005 | Chernoff et al. | 701/41 |
| 6,904,985 B2 | 6/2005 | Ferree et al. | 180/6.32 |
| 6,948,299 B2 | 9/2005 | Osborne | 56/10.8 |
| 6,948,740 B2 | 9/2005 | Chernoff et al. | 280/775 |
| 7,172,041 B2 | 2/2007 | Wuertz et al. | 180/6.24 |
| 7,237,629 B1 * | 7/2007 | Bland et al. | 180/6.24 |
| 7,686,107 B1 * | 3/2010 | Bland et al. | 180/6.24 |
| 7,914,022 B2 | 3/2011 | Ruebusch et al. | 280/93.502 |
| 7,942,220 B2 | 5/2011 | Dabbs et al. | 180/6.48 |
| 7,992,659 B2 | 8/2011 | Schaedler et al. | 180/6.24 |
| 8,011,458 B2 | 9/2011 | Hauser | 180/6.32 |
| 8,136,613 B2 | 3/2012 | Schaedler et al. | 180/6.24 |
| 8,157,030 B2 * | 4/2012 | Greenwood et al. | 180/6.48 |
| 2002/0005302 A1 | 1/2002 | Hidaka | 180/6.24 |
| 2002/0062583 A1 * | 5/2002 | Wakitani et al. | 37/246 |
| 2003/0019682 A1 * | 1/2003 | Schaedler et al. | 180/308 |
| 2006/0254840 A1 * | 11/2006 | Strong | 180/190 |
| 2007/0144796 A1 * | 6/2007 | Schaedler et al. | 180/6.24 |
| 2008/0277188 A1 * | 11/2008 | Hauser et al. | 180/422 |
| 2009/0250270 A1 | 10/2009 | Hauser | 180/6.32 |
| 2011/0053731 A1 | 3/2011 | Greenwood et al. | 476/47 |
| 2011/0079104 A1 * | 4/2011 | Sama | 74/512 |
| 2011/0193307 A1 * | 8/2011 | Ruebusch et al. | 280/93.513 |
| 2011/0247886 A1 * | 10/2011 | Sasahara et al. | 180/6.5 |
| 2011/0248462 A1 | 10/2011 | Schaedler et al. | 280/93.513 |
| 2012/0095636 A1 * | 4/2012 | Ishii et al. | 701/22 |
| 2012/0260759 A1 | 10/2012 | Shaedler et al. | 74/471 R |
| 2012/0298429 A1 | 11/2012 | Greenwood et al. | 180/6.32 |

FOREIGN PATENT DOCUMENTS

| | | |
|---|---|---|
| EP | 1 142 775 | 11/2009 |
| JP | 05-003966 | 1/1993 |
| WO | WO 01/87687 | 11/2001 |
| WO | WO 02/34562 | 5/2002 |
| WO | WO 02-102644 | 12/2002 |
| WO | WO 2005-069778 | 8/2005 |
| WO | WO 2005/098563 | 10/2005 |

OTHER PUBLICATIONS

Steering Geometry and Linkage, Oct. 24, 2008, Purdue University, retrieved from https://engineering.purdue.edu/ABE/ . . . /Lecture%201 on Apr. 8, 2014.*

Matthew Fulmer, Reducing Free Play in an Automotive Steering System, Apr. 30, 2009, Worcester Polytechnic Institute, retrieved from https://www.wpi.edu/Pubs/E-project/Available/E-project-042909-142141/unrestricted/MQP.pdf Aug. 18, 2014.*

International Search Report and Written Opinion in PCT/US2013/038024 mailed Aug. 12, 2013.

* cited by examiner

VEHICLE DRIVE CONTROL SYSTEMS AND THE RELATED VEHICLES

CROSS-REFERENCE(S) TO RELATED APPLICATION(S)

This application is a continuation of U.S. application Ser. No. 13/657,855, filed Oct. 22, 2012, which claims the benefit of U.S. Provisional Patent Application No. 61/637,838, filed Apr. 24, 2012; U.S. Provisional Patent Application No. 61/637,842, filed Apr. 24, 2012; and U.S. Provisional Patent Application No. 61/656,943, filed Jun. 6, 2012. The entire contents of these applications are incorporated by reference.

BACKGROUND

Field of the Invention

The present invention relates generally to vehicle control systems and, more particularly, but not by way of limitation, to vehicle drive control systems for controlling the drivable structures (e.g., wheels) of a vehicle. Such systems may include steering systems and may be used to equip a vehicle, such as a lawn tractor (e.g., a riding mower), to make a low-radius (e.g., a substantially zero-radius) turn, thus enhancing its maneuverability. Such systems may also be used on vehicles such as utility vehicles, golf carts, city cars, and agricultural equipment. The present invention also includes vehicles with such control systems.

SUMMARY

This disclosure includes embodiments of vehicle control systems that can be used, for example, to configure a vehicle (e.g., a lawn tractor or riding lawn mower) to make low- to substantially zero-radius turns. Embodiments of the present vehicle control systems utilize at least one steered wheel position sensor, which can detect the actual position of a steerable wheel (such as one of the front two wheels on a 4-wheel riding lawn mower) and which generates a signal that therefore indicates the actual position of that steerable wheel, rather than a projected or anticipated position of that steerable wheel. Such signal is processed by a control unit, which includes a microprocessor driven by software and/or firmware, and which, based on at least one other input (such as a speed (or speed and direction) input), generates one or more signals for controlling the one or more drivable structures (e.g., wheels) of the vehicle, which may be driven using one or more control unit-commanded (or control unit-controlled) drive motors (such as electric drive motors powered by one or more batteries) and gearsets (such as reduction gearsets), or which may be driven using one or more hydrostatic transmissions and actuators, or through other means. In other embodiments, the control unit may include a dedicated machine that has been hardwired to perform the same functions. Embodiments of the present vehicles that include such vehicle control systems may include steering systems that include such a steered wheel position sensor and that are configured to control the steered positions of the one or more steerable wheels, such as, for example, mechanically or electrically. Such steering systems may not be connected through one or more mechanical linkages to the drive units for the drivable wheels.

Other embodiments of the present vehicle control systems are configured for use with vehicles that use at least one steerable structure other than a wheel (a non-wheel steerable structure), like a ski, and utilize at least one steered non-wheel structure position sensor, which can detect the actual position of the non-wheel steerable structure and which generates a signal that therefore indicates the actual position of that non-wheel steerable structure, rather than a projected or anticipated position of that non-wheel steerable structure. Such embodiments are otherwise the same (or substantially similar) to the embodiments of the present vehicle control systems that are configured for use with vehicles that have at least one steerable wheel.

Some embodiments of the present vehicles comprise one or more solar panels (e.g., forming and/or coupled to a roof over the seat or other portion of the vehicle on which a user or operator may be disposed during operation of the vehicle), which may be coupled and/or configured to be coupled to a battery source via any appropriate circuitry or other connection.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or a component of a system that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Further, a vehicle drive control system, or a component of such a system, that is configured in a certain way is configured in at least that way, but it can also be configured in other ways than those specifically described.

Any embodiment of any of the present control systems and vehicles can consist of or consist essentially of—rather than comprise/include/contain/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The term "coupled" is defined as connected, although not necessarily directly, and not necessarily mechanically. Two items are "couplable" if they can be coupled to each other. Unless the context explicitly requires otherwise, items that are couplable are also decouplable, and vice-versa. One non-limiting way in which a first structure is couplable to a second structure is for the first structure to be configured to be coupled to the second structure. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The feature or features of one embodiment may be applied to other embodiments, even though not described or illustrated, unless expressly prohibited by this disclosure or the nature of the embodiments.

Details associated with the embodiments described above and others are presented below.

DESCRIPTION OF ILLUSTRATIVE EMBODIMENTS

The vehicle and its components shown in the figures, except for the schematics and diagrams in FIGS. 12-15, are drawn to scale.

Figure 1:
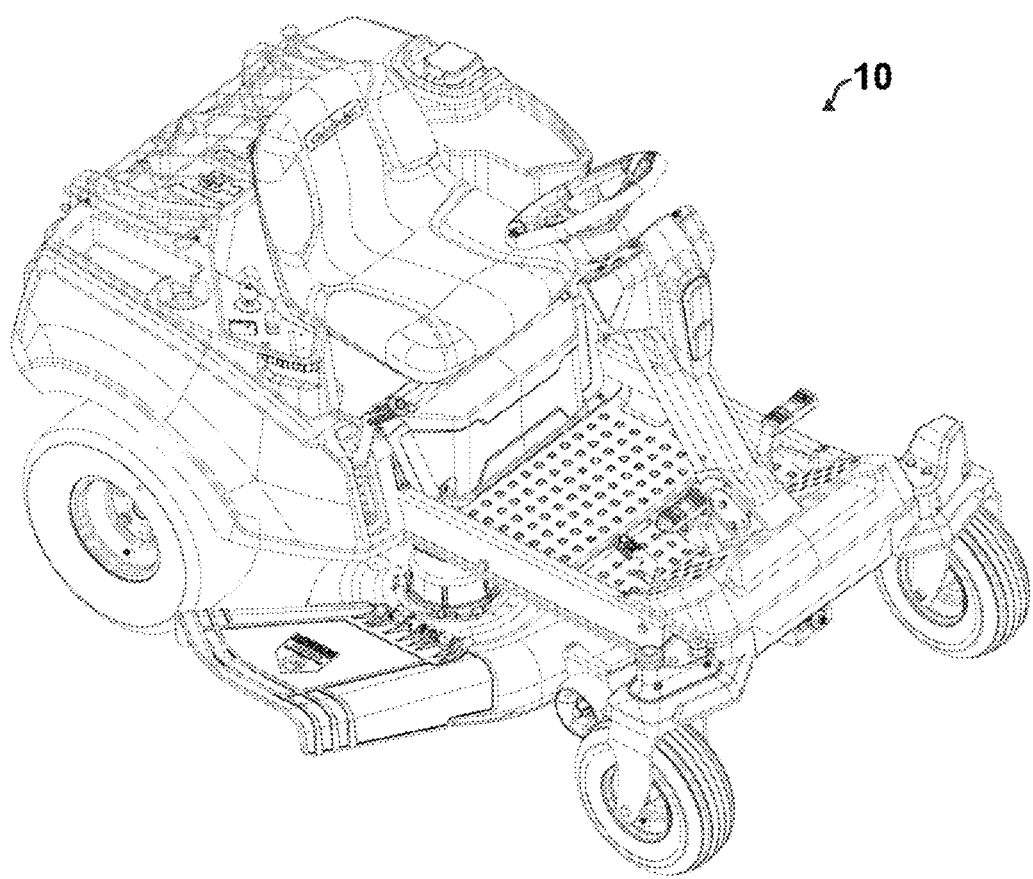
FIGS. 1-7 illustrate an exemplary embodiment of a vehicle, as well as various individual components and systems of the vehicle.
Figure 2:
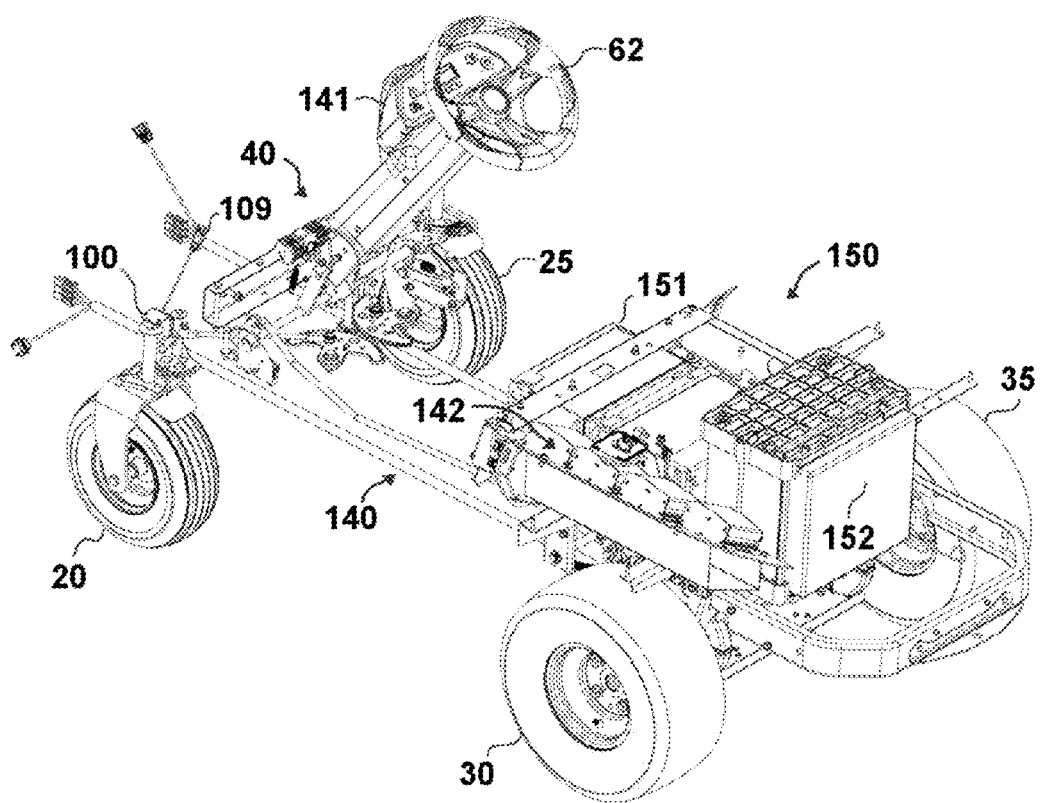
Figure 3:
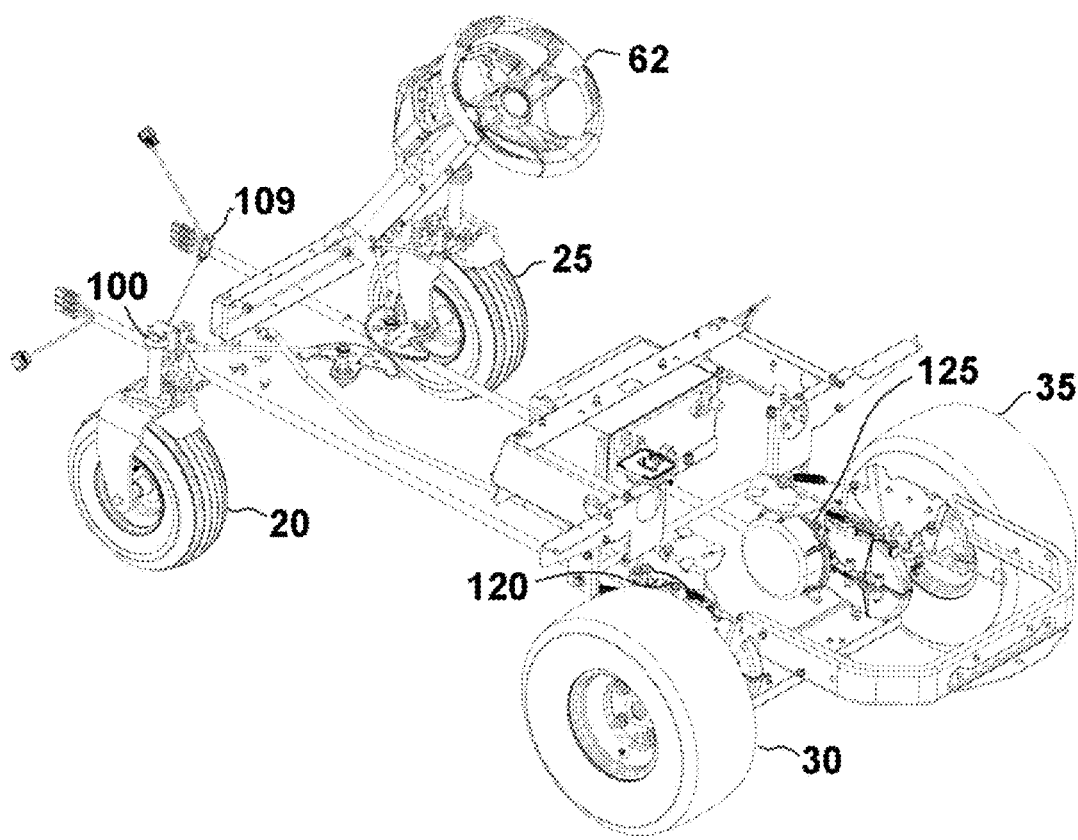

FIGS. 1-7 illustrate an exemplary embodiment of a vehicle 10, as well as various individual components and systems of vehicle 10. For example, FIG. 1 provides a perspective view of vehicle 10, while FIGS. 2-3 provide a view of systems visible when the body of vehicle 10 is removed.

In this embodiment, vehicle 10 comprises left and right steerable structures (e.g., wheels) 20, 25 and left and right drivable structures (e.g., wheels) 30, 35. Vehicle 10 also comprises a steering assembly 40 comprising a steering input gear 60 coupled to a steering input member 62. A shown in FIG. 5, in this exemplary embodiment, steering assembly 40 further comprises a left geared member 50 and a right geared member 55 engaged with steering input gear 60 and pivotable in response to turning of steering input gear 60.

Steering assembly 40 also comprises a left drivable gear 70 coupled to left geared member 50 through a left linkage 80 and engaged with a left driven gear 90. In the embodiment shown, left driven gear 90 is coupled to left steerable wheel 20 such that left steerable wheel 20 rotates with left driven gear 90 (meaning the two rotate together).

In the embodiment shown, steering assembly 40 further comprises a right drivable gear 75 coupled to right geared member 55 through a right linkage 85 and engaged with a right driven gear 95. In this embodiment, right driven gear 95 is coupled to right steerable wheel 25 such that the right steerable wheel rotates with right driven gear 95.

In some embodiments, steering assembly 40 can be power assisted. For example, steering assembly 40 can comprise and/or be coupled to one or more actuators (e.g., hydraulic, electric, or any other suitable type of actuator that permits the actuator(s)) to apply a force to or within steering assembly 40 (e.g., via steering input gear 60, right geared member 55, and/or left geared member 50) to reduce the force required from a user to steer and/or control the direction of the vehicle during operation of the vehicle.

Steering can be accomplished without gearing and with or without power assist in other embodiments. For example, in some embodiments, steering could be accomplished with a pump and cylinder. In other embodiments, steering could be accomplished with cams and links.

Figure 5:
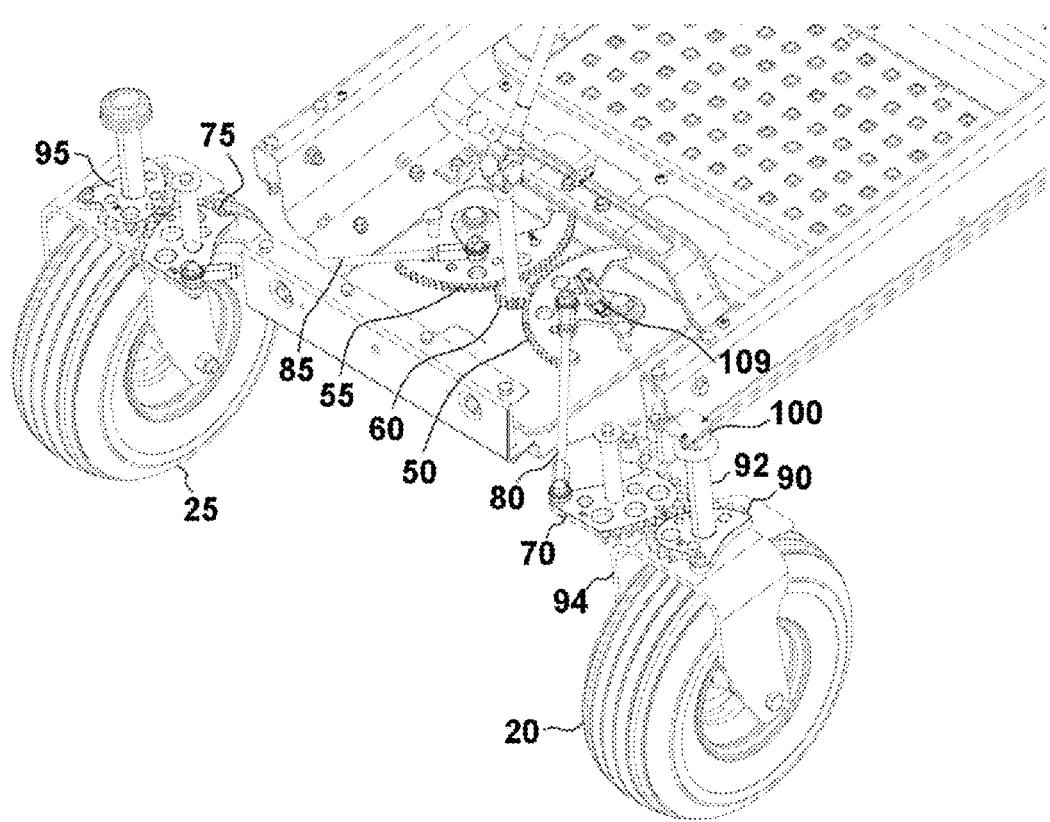

As shown in FIG. 5, steering assembly 40 further comprises a steered wheel position sensor 100 coupled to left steerable wheel 20. In the embodiment shown, steered wheel position sensor 100 is coupled to a kingpin 92 that is coupled to left driven gear 90, which is in turn coupled to left steered wheel 20 via bracket 94. Steered wheel position sensor 100 is coupled to an electrical coupling device 109 configured to couple to a control system (described in more detail below) and provide appropriate electrical signals through electrical coupling device 109 (which coupling device may comprise a Molex MX-150 connector).

Steered wheel position sensor 100 is configured to generate a signal corresponding to the actual (rather than the anticipated or commanded) position of left steerable wheel 20. Thus, and for example, if left steerable wheel 20 has been pivoted to the left by 45 degrees, steered wheel position sensor 100 will generate a signal corresponding to an angle of 45 degrees. In certain embodiments, steering assembly 40 may comprise a steered wheel position sensor coupled to right steerable wheel 25. In particular embodiments, steering assembly 40 may comprise one steered wheel position sensor coupled to left steerable wheel 20 and another steered wheel position sensor coupled to right steerable wheel 25. The signal from one of the two sensors may be utilized as indicative of the actual position of one of the two steerable wheels of the depicted vehicle. In embodiments involving vehicles with two or more steerable structures and at least two steered wheel position sensors, the system may be configured to sample signals from both, compare them for consistency, and resolve any lack of consistency in any suitable fashion.

Figure 6:
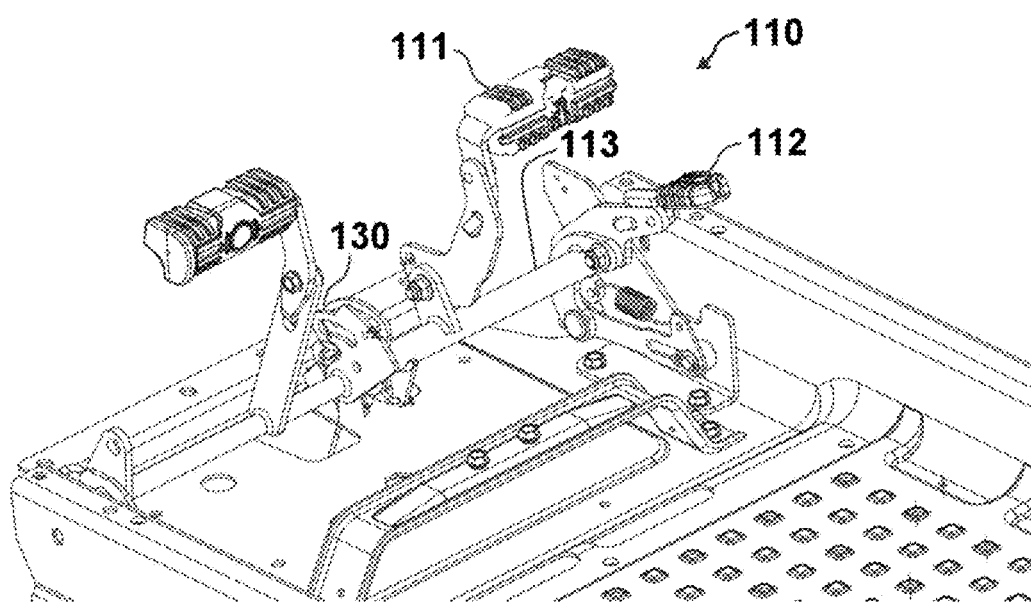
Figure 7:
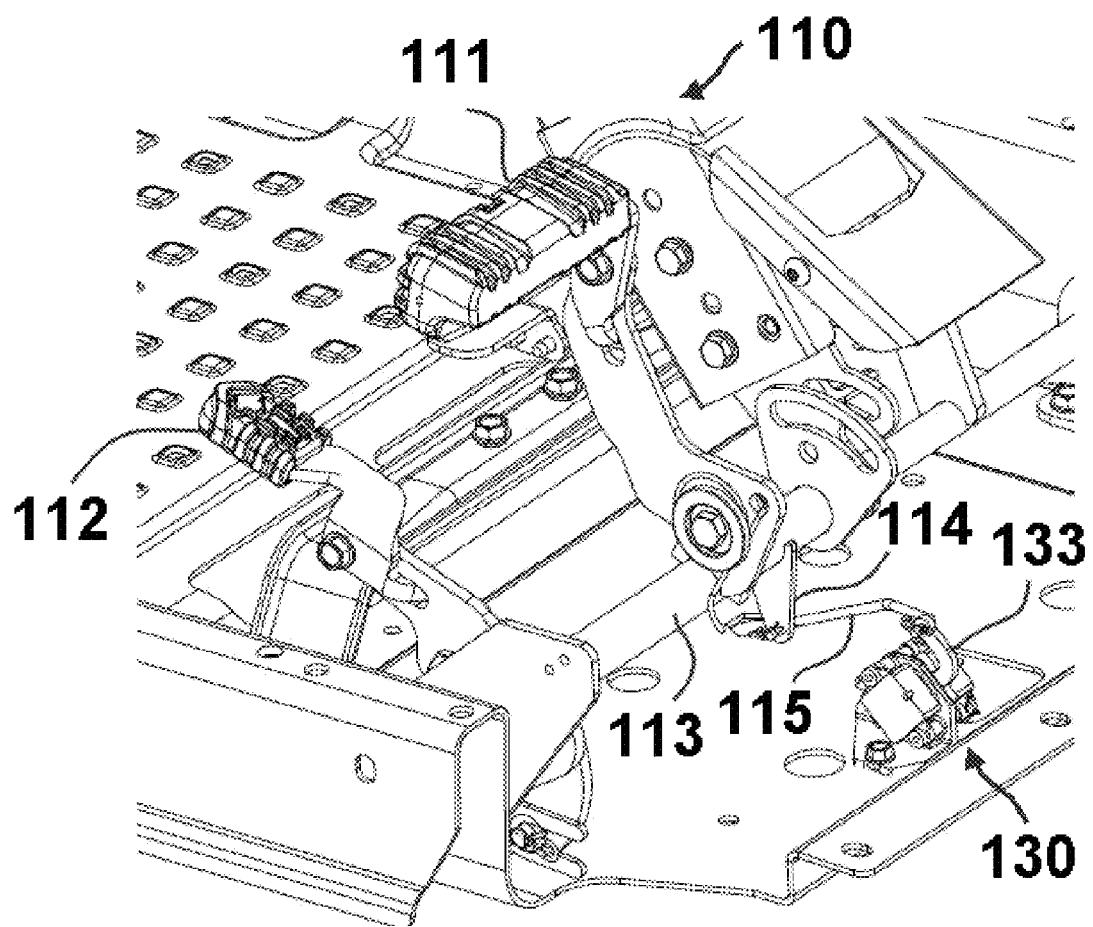
Figure 8:
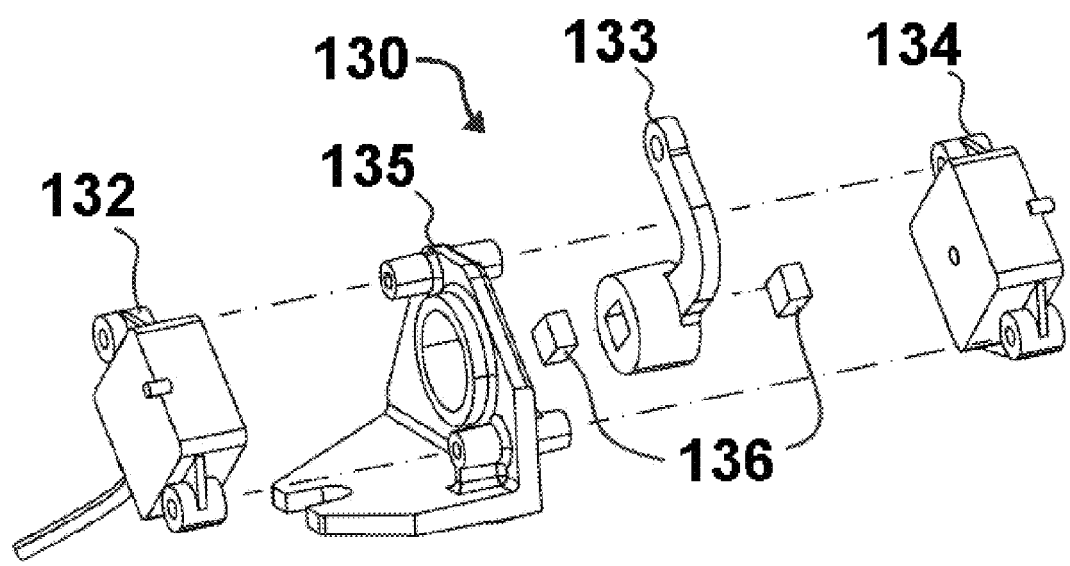
FIG. 8 shows an exploded view of the speed input sensor of the vehicle.

Referring now to FIG. 6-8, vehicle 10 further comprises a speed input device 110 configured to provide a speed input (in the form of a magnitude and a direction) to a right drive unit 120 and a left drive unit 125 (FIG. 3) coupled to left and right drivable wheels 30 and 35, respectively. In the embodiment shown, right and left drive units 120, 125 are configured as electric motors coupled to the drivable wheels through respective transmissions (e.g., reduction gearsets), and vehicle 10 further comprises a battery source 150 (FIG. 2) configured to power the left and right drive units 120, 125. In other embodiments, the right and left drive units may be configured for example, as one or more internal combustion engines with or without hydrostatic transmissions (see FIG. 13). In still other embodiments, the left and right drive units could be pneumatically driven. In still other embodiments, the left and right drive units could comprise a transmission arrangement that includes left and right variators mounted to a common shaft, such as the transmission arrangement (or system) disclosed in U.S. Ser. No. 12/523,718 (and published as U.S. Patent App. Publ. No.: 2010/024887), FIGS. 2-5 and the corresponding description of which are incorporated by reference.

Figure 4A:
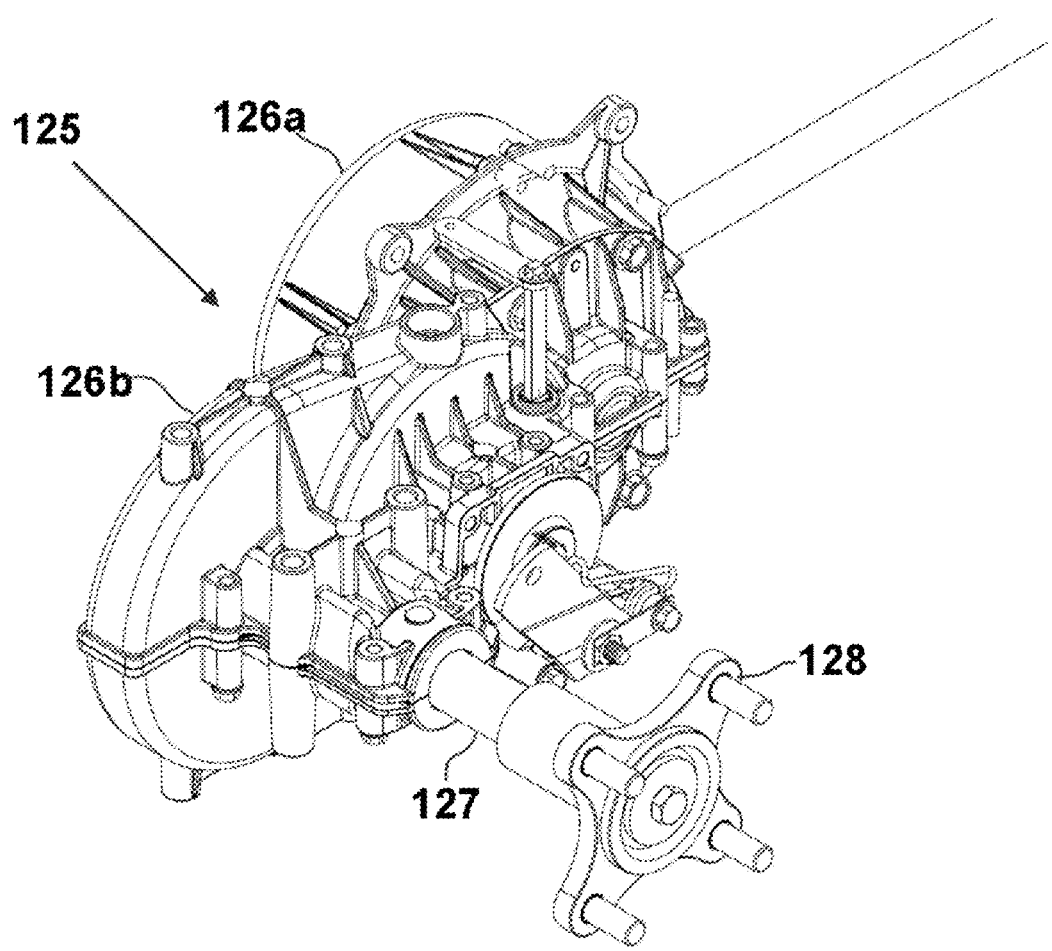
Figure 4B:
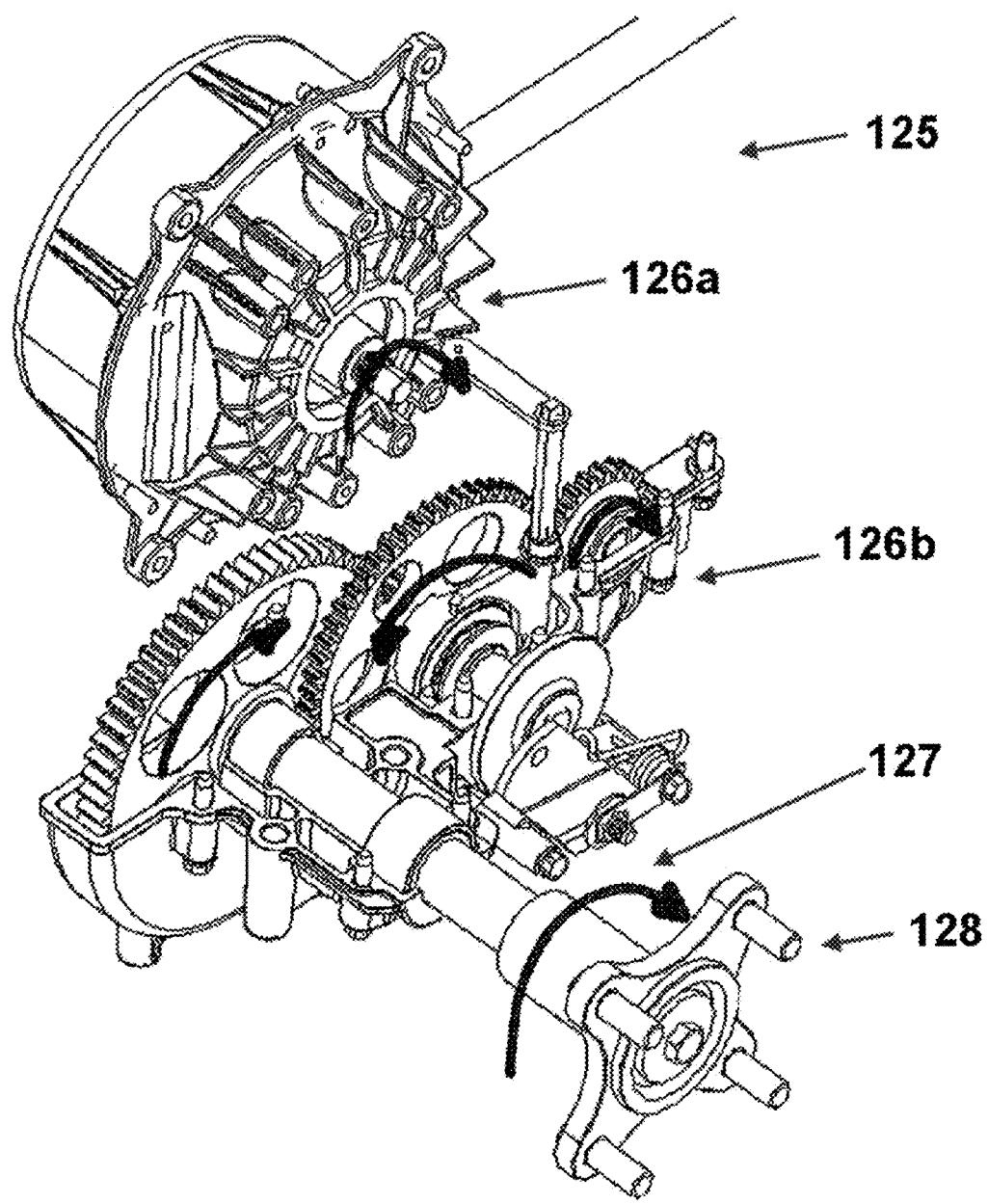

In the illustrated embodiment, right and left drive units 120, 125 are powered by a front battery pack 151 and a rear battery pack 152 of battery source 150. FIG. 3 illustrates a perspective view with some of the batteries of packs 151 and 152 removed so that right drive unit 125 is visible. FIG. 4A provides a perspective view of right drive motor 126a coupled to a transmission 126b of right drive unit 125, which transmission is coupled to a right axle 127 (a drop axle, more specifically). Right axle 127 is coupled to a right hub 128, which is configured to couple to right drivable wheel 35 (not shown in FIG. 4A). FIG. 4B provides a view of the reduction gears within transmission 126b, and shows the directions of rotation for the forward direction.

In this embodiment, speed input device 110 comprises a forward pedal 111 and a reverse pedal 112 coupled to a shaft 113. In the illustrated embodiment, vehicle 10 comprises a speed input sensor 130 configured to generate a signal representative of the commanded speed input from speed input device 110. Such a signal may indicate at least the speed itself, and may also indicate the direction. In this embodiment, shaft 113 is coupled to a leverage member 114, which is coupled to a linkage 115 and an actuator arm 133 of speed input sensor 130. If either forward pedal 111 or reverse pedal 112 are pushed, shaft 113 will rotate and cause leverage member 114 to act on linkage 115. This will cause actuator arm 133 of speed input sensor 130 to move. In other embodiments, speed input sensor 130 is not located in the position shown in FIG. 6. For example, in other embodiments, the speed input device could take the form of a single foot pedal or of a lever (such as one that could be operated by hand), and the speed input sensor could be connected to or otherwise built into such structures. In other embodiments, the speed input device could take the form of a system in which speed is increased and/or decreased using a button or buttons (or trigger or switch) and, even more specifically, in which speed is increased and/or decreased based on the number of times and/or the duration the button(s) are pressed, and the speed input sensor may be a structure configured to process such commands and generate a signal representative of the commanded speed input.

Referring specifically now to FIG. 8, an exploded view of speed input sensor 130 shows actuator arm 133, as well as a pair of sensors 132, 134 mounted to a bracket 135. In this embodiment, sensors 132 and 134 are Hall effect sensors and a pair of magnets 136 are coupled to actuator arm 133. During operation, actuator arm 133 rotates (as a result of a speed input from speed input device 110), sensors 132 and 134 detect the rotational movement of magnets 136 and provide an electrical signal to a control unit 140 corresponding to the magnitude and direction of the speed input (discussed in further detail below). In other embodiments, the two sensors read the same magnet. A calibration procedure may be used before a vehicle having the depicted and described embodiment of the present control systems is operated so that control unit (discussed below) learns what sensor signal corresponds to a full forward speed pedal, a full reverse speed pedal, and a neutral speed pedal. The control unit, and in particular the vehicle control module (discussed below), interpolates between the three calibration points. If the signals from these two sensors do not match (such as if one became unplugged), the vehicle control module will not allow the vehicle to drive, and may display an appropriate message on an operator visible display (such as throttle sensor error). In other embodiments, speed input sensor 130 comprises only a single sensor, such as a single Hall effect sensor.

Figure 9:
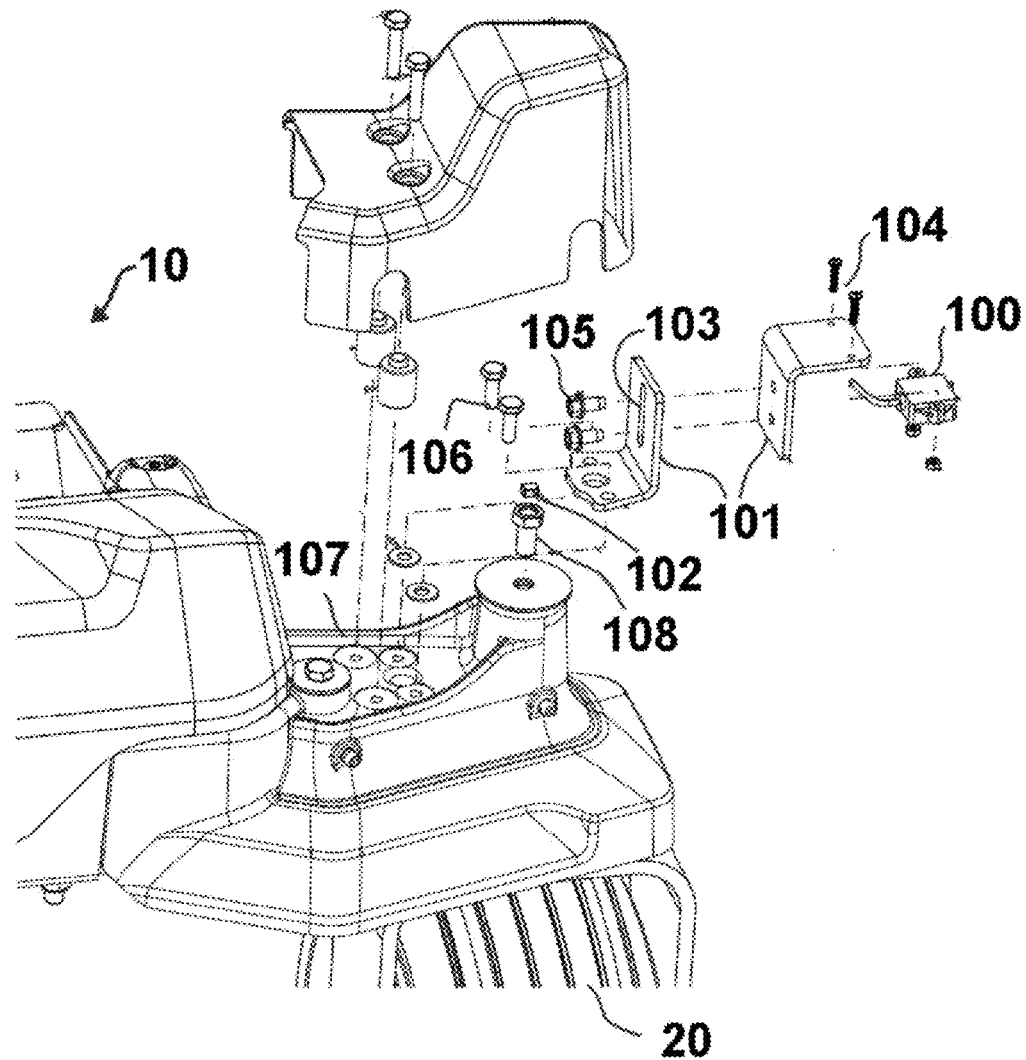
FIG. 9 shows an exploded view of the mounting assembly for the steered wheel position sensor of the vehicle.

Referring now to FIG. 9, an exploded view of the mounting assembly is shown for steered wheel position sensor 100. In this embodiment, steered wheel position sensor 100 is mounted to an adjustable bracket 101 via coupling members 104. The end of adjustable bracket 101 that is distal from steered wheel position sensor 100 is mounted to a structure 107 (which is connected to the vehicle's chassis) via coupling members 106. Adjustable bracket 101 comprises a slot 103 and adjustment members 105 that allow the height of adjustable bracket 101 to be altered.

In the embodiment shown, a magnet 102 is coupled to a mounting member 108 that is coupled to kingpin 92. In certain embodiments, mounting member 108 may be threaded into kingpin 92 so that rotation of kingpin 92 (and left steerable wheel 20 by virtue of the yoke to which kingpin 92 is coupled (e.g., fixedly connected)) will cause rotation of mounting member 108 and magnet 102. Adjustable bracket 101 can be adjusted so that the distance between steered wheel position sensor 100 and magnet 102 is at the desired gap. In certain embodiments, steered wheel position sensor 100 is a Hall effect sensor and the desired gap between sensor 100 and magnet 102 is between approximately 0.025-0.035 inches. The magnets of the present sensors may be keyed and polarized. Furthermore, the Hall effect sensors that are used may be sealed or otherwise configured to limit their exposure to the elements. Alternatives to Hall effect sensors include other angular position sensors, such as optical encoders and variable resistors.

Figure 10:
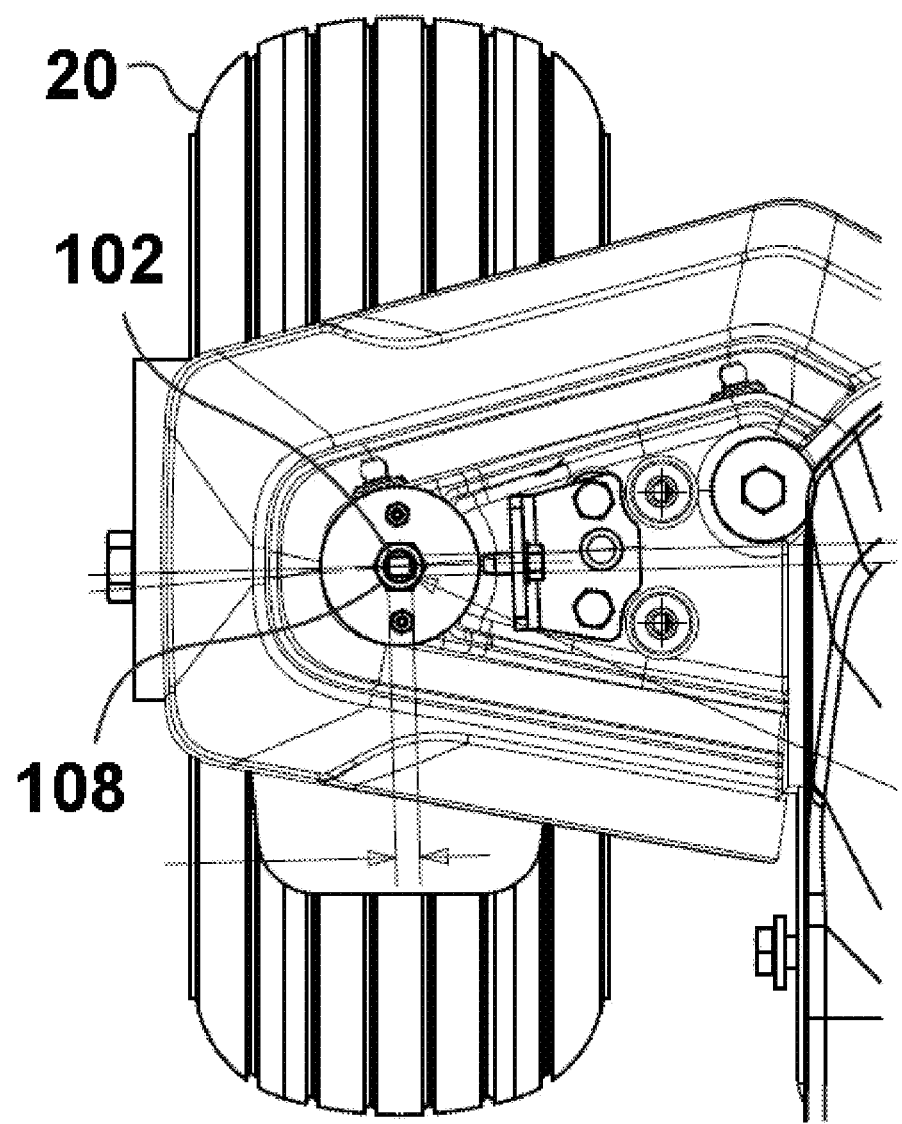
FIG. 10 provides a top view of a magnet and a mounting member of the vehicle, with the steered wheel position sensor removed.

FIG. 10 provides a top view of magnet 102 and mounting member 108 with sensor 100 removed. In particular embodiments, it may be desirable to orient the magnet in a particular direction as shown in FIG. 10.

Figure 11:
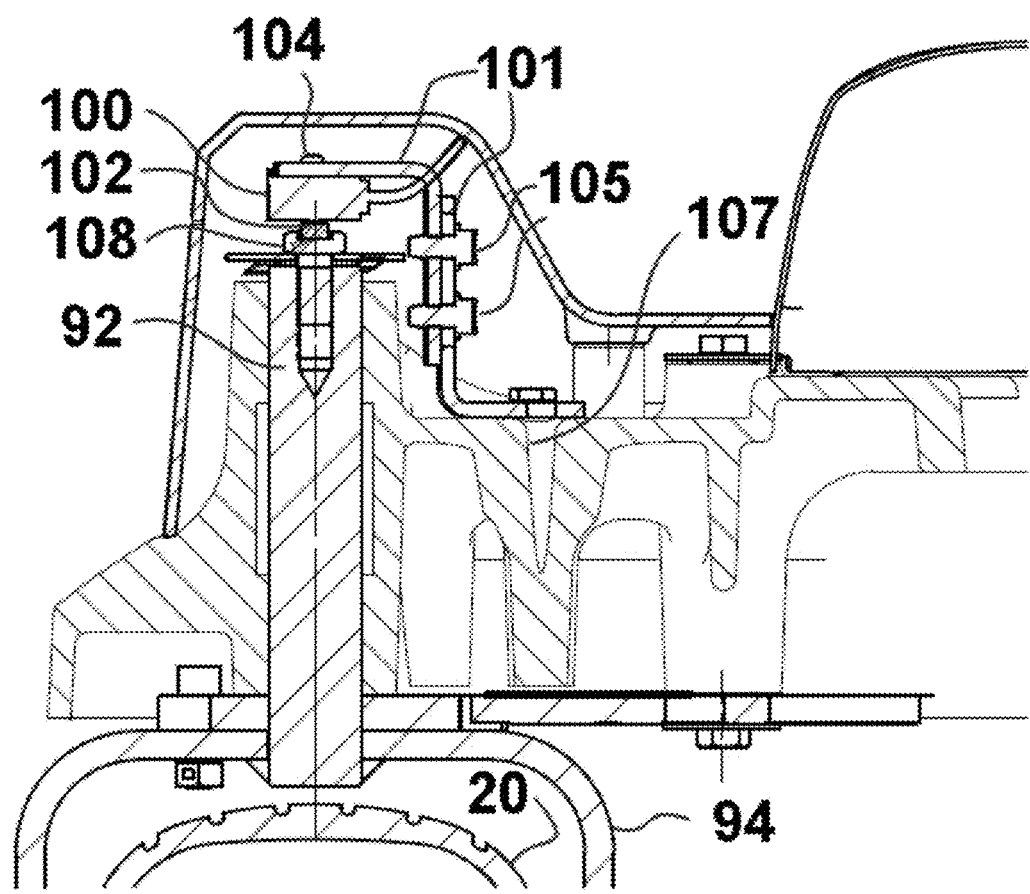
FIG. 11 provides a side section view of the steered wheel position sensor and related mounting components.

FIG. 11 provides a side section view of sensor 100 and related mounting components. As shown in the side view of FIG. 11, the gap between magnet 102 and sensor 100 can be varied by loosening adjustment members 105 and raising or lowering the portion of adjustable bracket 101 to which sensor 100 is coupled. When the desired gap between magnet 102 and sensor 100 is achieved, adjustment members 105 can be tightened so that the length (e.g., height) of adjustable bracket 101 is fixed.

In an exemplary embodiment, control unit 140 is coupled to steered wheel position sensor 100, speed input sensor 130, and left and right drive units 120, 125. In certain exemplary embodiments, control unit 140 comprises a vehicle control module 141 and a plurality of controllers 142. Control unit 140 is configured to generate signals for controlling left and right drive units 120, 125 as a function of at least the signal corresponding to the actual position of steerable wheel 20 (e.g., the signal generated by steered wheel position sensor 100), and the signal representative of the commanded speed input (e.g., the signal generated by speed input sensor 130). In particular embodiments, speed input sensor 130 is coupled to shaft 113 and configured to generate a signal representative of an actual position of shaft 113.

For example, during a left turn, control unit 140 can provide a control signal (via control module 141 and controllers 142) to left drive unit 120 that causes left drivable wheel 30 to rotate at a slower speed than right drivable wheel 35. In an extreme left turn, control unit 140 can provide a control signal to left drive unit 120 that causes left drivable wheel 30 to rotate in a direction opposite of right drivable wheel 35, driving vehicle 10 in a substantially zero-radius turn. In certain embodiments, control unit 140 is capable of reducing the speed of the drivable wheel positioned on an outboard side of the extreme turn at least when forward pedal 111 of speed input device 110 has been moved to a full forward position.

While control unit 140 is illustrated (e.g., FIG. 2) as being on board an exemplary vehicle, in other embodiments, one or more components of control unit 140—such as vehicle control module 141—may not be positioned on board the vehicle. For example, such one or more components may be located on (or otherwise comprise) a structure remote from the vehicle (such as a control station) and be coupled to the balance of control unit 140 through any suitable means, such as wirelessly; embodiments of the present vehicle control systems that include such a control unit may be characterized as robotic vehicle control systems or remotely-controlled vehicle control systems, with the off-board control unit component(s) characterized as part of a master device, system, or structure to which the remaining control unit component(s) are slaved.

Figure 12:
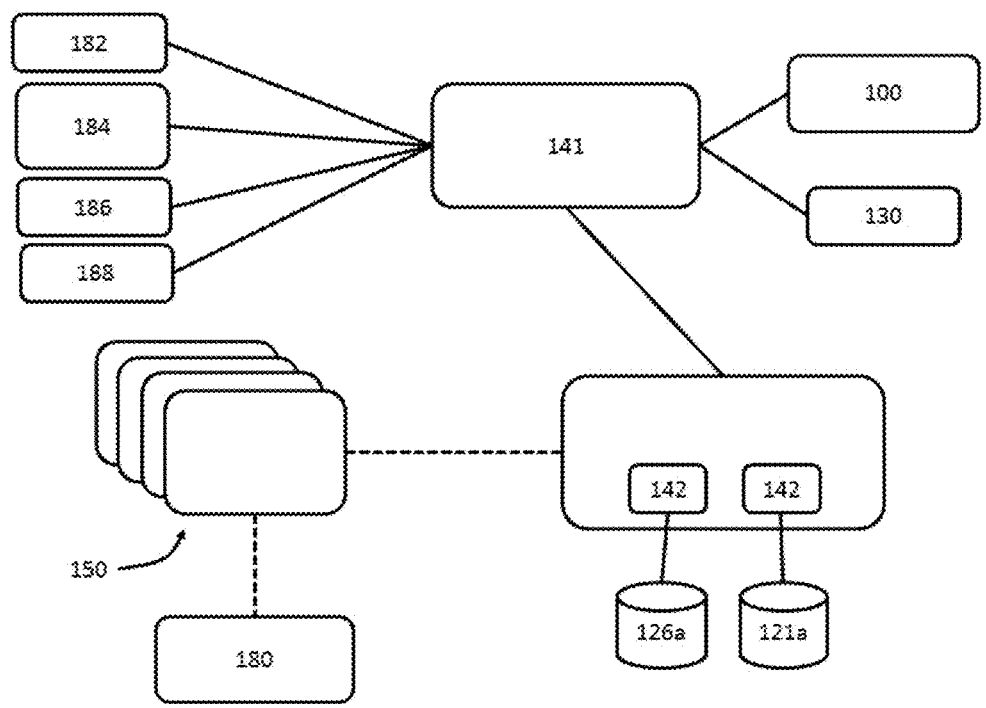
FIG. 12 provides a schematic of an exemplary electrical system control diagram for an embodiment that utilizes drive units that include electric drive motors.

FIG. 12 provides a schematic of an exemplary electrical system control diagram for an embodiment (e.g., the embodiment shown in FIGS. 1-11) utilizing drive units that include electric drive motors (represented by right and left motors 126a and 121a, respectively). As FIG. 12 shows, control module 141 may be connected to (and therefore able to process signals from) brake switch 182, operator presence switch 184, key switch 186, and charger switch 188. Battery source 150 for powering motors 126a and 121a and, optionally, the cutting blade motors may comprise four 12-volt maintenance free, valve-regulated, lead-acid batteries (East Penn; part number 8A27M). Battery source 150 may be coupled to a charger connection 180 that can be coupled to an off-board charging system. Those of ordinary skill in the art will understand that in embodiments that utilize one or more electric drive motors, the motors may be sized appropriately for the size, weight, and speed capability of the vehicle. The motors may be electrically commutated and paired with an appropriate controller, as those of ordinary skill in the art will understand. In some embodiments, 48-volt, 3-phase brushless DC permanent magnet motors may be used. Other batteries and electric motors may be used in other embodiments.

Figure 13:
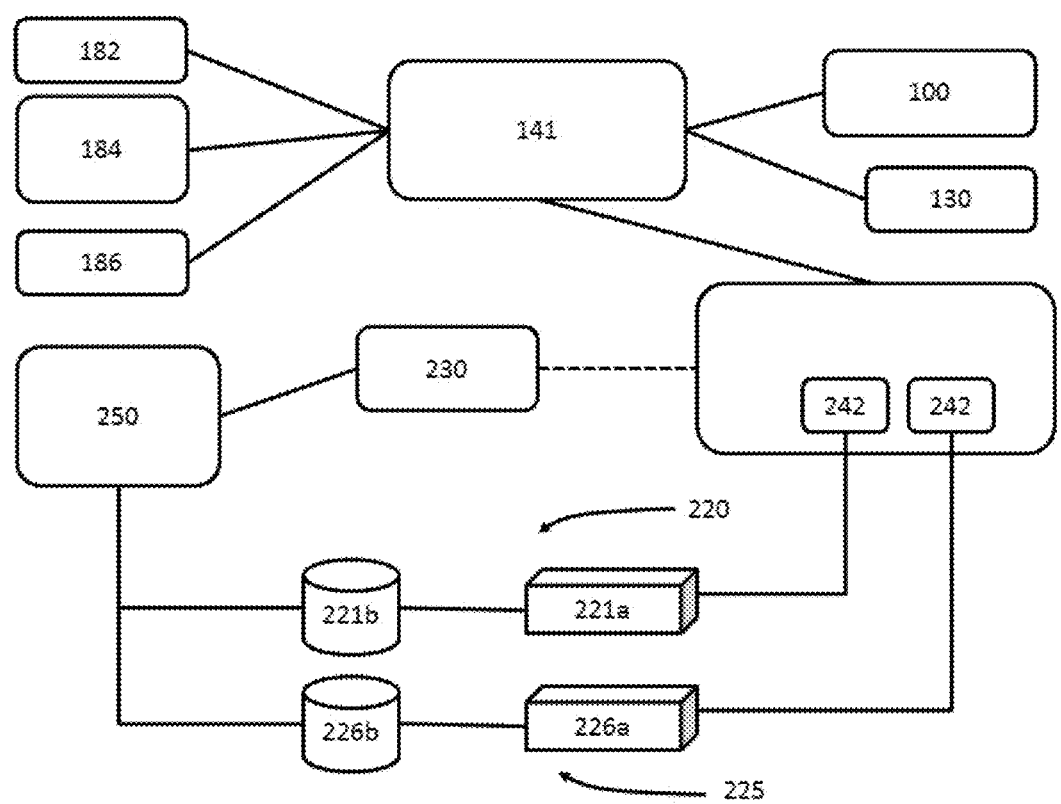
FIG. 13 provides a schematic of an exemplary electrical system control diagram for an embodiment that utilizes an internal combustion engine and hydrostatic transmissions for the drive units.

FIG. 13 provides a schematic of an exemplary electrical system control diagram for an embodiment utilizing an internal combustion engine and hydrostatic transmissions (and actuators, such as linear actuators) for the drive units. As FIG. 13 shows, control module 141 may be connected to (and therefore able to process signals from) brake switch 182, operator presence switch 184, and key switch 186. Internal combustion engine 250 is connected to alternator 230, which can be used to help keep a battery charged (not shown) for starting the engine. The alternator can (but need not) be connected to controllers 242, which are configured to send signals for controlling the left and right drive units 220 and 225, which comprise left and right actuators 221a and 226a, respectively, coupled to left and right hydrostatic transmissions 221b and 226b, respectively.

Figure 14:
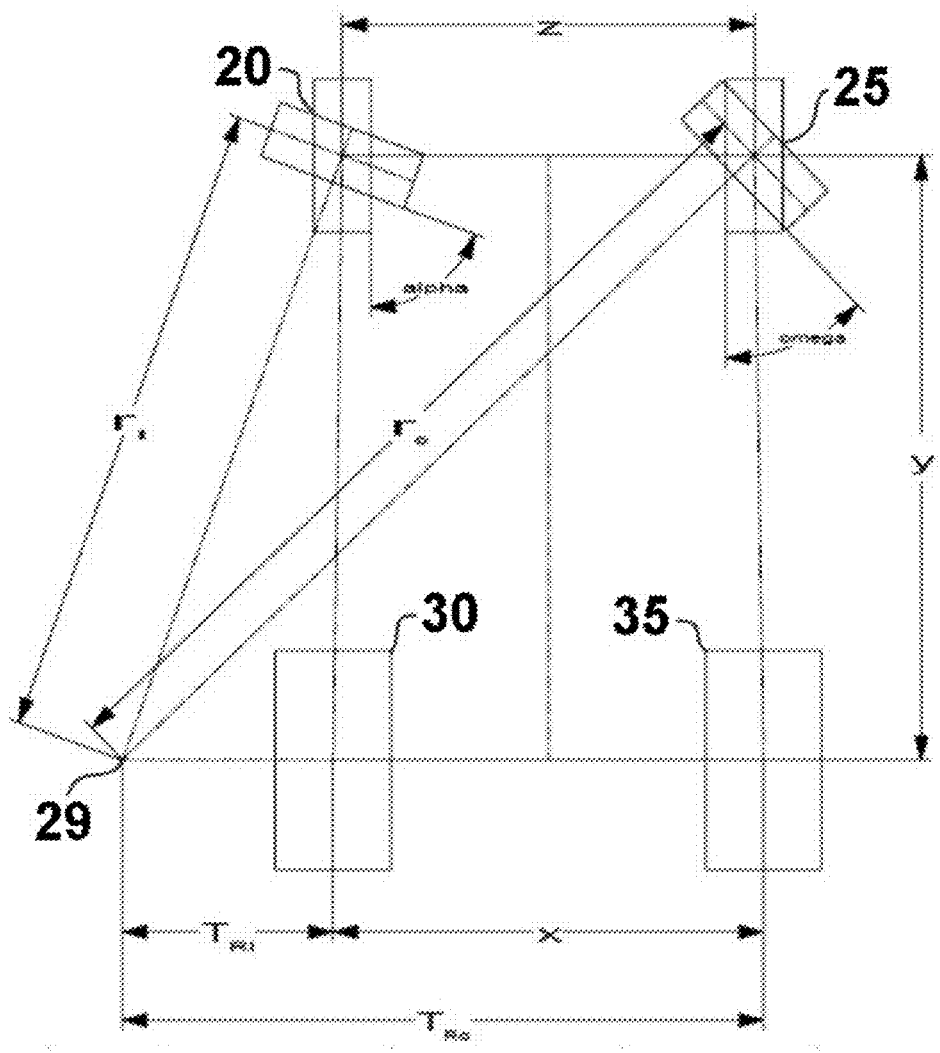
FIG. 14 illustrates a schematic of multiple geometric variables at variable steering input angles.

FIG. 14 illustrates a schematic of multiple geometric variables (discussed in further detail in the tables below) at variable steering input angles. As shown in FIG. 14, left steerable wheel 20 and right steerable wheel 25 have turning radii $r_i$ and $r_o$ with a common center point 29.

Table 1 below provides equations used to calculate or measure the variables addressed in Tables 2-7, some of which are shown in FIG. 14.

TABLE 1

Equations:

$T_{Ri} = \tan(90° - \alpha) \cdot y - o_{rear}$ $T_{Ro} = T_{Ri} + x$ $r_i = \text{SQRT}(y^2 + (T_{Ri} + o_{rear})^2) - o_{front}$ $r_o = \text{SQRT}(y^2 + (T_{Ro} - o_{rear})^2) - o_{front}$ $\omega = 90 - \tan^{-1}((T_{Ro} - o_{front})/y)$ Axle Ratio = $T_{Ro}/T_{Ri}$ $\alpha_{u\text{-}turn} = 90 - \tan^{-1}(o_{rear}/y)$ $\alpha_{zero\text{-}turn} = 90 - \tan^{-1}((-x/2 + o_{rear})/y)$ $\text{MPH}_{inside}$ = Outside Wheel Speed/Axle Ratio $\text{MPH}_{outside}$ =

$\text{Full}_{REV} - ((\text{Full}_{REV}/2)/(\alpha_{zero\text{-}turn} - \alpha_{slowdown}) \cdot (\alpha_{current} - \alpha_{slow\ down})$ Table 2 below provides the nomenclature for the variables used in the equations of Table 1 and/or Tables 3-7.

TABLE 2

Nomenclature:

x = Wheel Base (rear)
z = Wheel base (front)
y = Track Width
$o_{front}$ = front wheel offset
$o_{rear}$ = rear wheel offset
$w_{tire}$ = Front tire width
$\alpha$ = Steering angle inside front (°)
$\omega$ = Steering angle outside front (°)
$T_{Ri}$ = Turning radius inside rear
$T_{Ro}$ = Turning radius outside rear
$r_i$ = Turning radius inside front
$r_o$ = Turning radius outside rear
$\alpha_{u\text{-}turn}$ = Inside wheel angle @ a U Turn
$\alpha_{zero\text{-}turn}$ = Inside wheel angle @ a Zero Turn
$\text{MPH}_{inside}$ = Inside Rear Wheel Speed
$\text{MPH}_{outside}$ = Outside rear Wheel Speed
$\alpha_{current}$ = Current inside wheel angle (for calculation)
$\alpha_{slowdown}$ = Inside Wheel Angle at the point of outside Table 3 below provides calculated values for the variables shown in Table 2 at a full forward speed input, where:

| y | z | $w_{tire}$ | $o_{front}$ | $o_{rear}$ | U-Turn (α) | Zero-Turn (α) | Full Fwd Speed (MPH) | Full Reverse Speed (MPH) |
|---|---|---|---|---|---|---|---|---|
| 49.6 | 33.841 | 4.69 | 2.345 | 0.7475 | 89.13658562 | 108.8365163 | 7 | −3.5 |

Unless otherwise specified, in Tables 3-7 (and the chart in the preceding paragraph), distance values are expressed in inches, angle values are expressed in degrees, and speed values are expressed in miles per hour. The values for y, z, $w_{tire}$, $o_{front}$, U-turn (a) and Zero-Turn (α) remain constant for Tables 3-7, while the forward and reverse speeds are varied.

TABLE 3

| $T_{ri}$ | $T_{Ro}$ | $r_i$ | $r_o$ | ω | Axle Ratio | Inside Wheel Speed (MPH) | Outside Wheel Speed (MPH) |
|---|---|---|---|---|---|---|---|
| 8.09698E+17 | 8.09698E+17 | 8.09698E+17 | 8.09698E+17 | 0 | 1 | 7.000 | 7.000 |
| 280.5480783 | 315.8840783 | 283.290016 | 321.361023 | 8.989355 | 1.125953456 | 6.217 | 7.000 |
| 135.52738 | 170.86338 | 142.6756982 | 179.5442456 | 16.40073 | 1.260729603 | 5.552 | 7.000 |
| 85.16222006 | 120.4982201 | 96.855 | 131.9613375 | 22.77237 | 1.414925773 | 4.947 | 7.000 |
| 58.36347819 | 93.69947819 | 74.81890181 | 107.7026302 | 28.49931 | 1.605447124 | 4.360 | 7.000 |
| 40.87184171 | 76.20784171 | 62.40320155 | 92.64684478 | 33.88195 | 1.864556098 | 3.754 | 7.000 |
| 27.88907335 | 63.22507335 | 54.9281467 | 82.11722055 | 39.17027 | 2.267019508 | 2.825 | 6.405 |
| 17.30542362 | 52.64142362 | 50.43821751 | 74.13036974 | 44.60057 | 3.041903208 | 1.910 | 5.810 |
| 16.33114962 | 51.66714962 | 50.11298579 | 73.42925084 | 45.16093 | 3.163717854 | 1.818 | 5.751 |
| 15.36851693 | 50.70451693 | 49.80752632 | 72.74289443 | 45.72551 | 3.299245929 | 1.725 | 5.691 |
| 14.4167418 | 49.7527418 | 49.52131112 | 72.07070347 | 46.2946 | 3.451039249 | 1.632 | 5.632 |
| 13.47507113 | 48.81107113 | 49.25385202 | 71.41211859 | 46.86848 | 3.622323819 | 1.538 | 5.572 |
| 12.54277994 | 47.87877994 | 49.00469855 | 70.7666161 | 47.44745 | 3.817238296 | 1.444 | 5.513 |
| 11.61916894 | 46.95516894 | 48.77343602 | 70.13370606 | 48.03183 | 4.04118136 | 1.349 | 5.453 |
| 10.70356228 | 46.03956228 | 48.55968375 | 69.51293063 | 48.62192 | 4.301330816 | 1.254 | 5.394 |
| 9.795305459 | 45.13130546 | 48.36309351 | 68.90386257 | 49.21805 | 4.607442376 | 1.158 | 5.334 |
| 8.893763333 | 44.22976333 | 48.18334807 | 68.30610388 | 49.82055 | 4.97312124 | 1.061 | 5.275 |
| 7.998318243 | 43.33431824 | 48.02015995 | 67.71928461 | 50.42976 | 5.417928735 | 0.963 | 5.215 |
| 7.10836824 | 42.44436824 | 47.87327024 | 67.14306186 | 51.04602 | 5.971042412 | 0.863 | 5.156 |
| 6.223325401 | 41.5593254 | 47.7424476 | 66.57711885 | 51.6697 | 6.677993311 | 0.763 | 5.096 |
| 5.342614221 | 40.67861422 | 47.62748734 | 66.02116417 | 52.30117 | 7.613990556 | 0.662 | 5.037 |
| 4.465670069 | 39.80167007 | 47.52821067 | 65.47493109 | 52.94082 | 8.912810273 | 0.558 | 4.977 |
| 3.591937711 | 38.92793771 | 47.44446394 | 64.93817713 | 53.58903 | 10.83758708 | 0.454 | 4.918 |
| 2.720869872 | 38.05686987 | 47.37611814 | 64.4106836 | 54.24621 | 13.98702314 | 0.347 | 4.858 |
| 1.851925852 | 37.18792585 | 47.32306836 | 63.89225531 | 54.91279 | 20.08067753 | 0.239 | 4.799 |
| 0.984570167 | 36.32057017 | 47.2852334 | 63.38272048 | 55.58919 | 36.88977321 | 0.128 | 4.739 |
| 0.11827122 | 35.45427122 | 47.26255547 | 62.88193062 | 56.27587 | 299.7709087 | 0.016 | 4.680 |
| 4.66294E−15 | 35.336 | 47.2606323 | 62.81420152 | 56.37049 | 7.57806E+15 | 0.000 | 4.672 |
| −0.7475 | 34.5885 | 47.255 | 62.38976065 | 56.97329 | −46.2722408 | −0.100 | 4.621 |
| −1.61327122 | 33.72272878 | 47.26255547 | 61.90610907 | 57.68192 | −20.90332261 | −0.218 | 4.561 |
| −2.479570167 | 32.85642983 | 47.2852334 | 61.43089828 | 58.40226 | −13.25085705 | −0.340 | 4.502 |
| −3.346925852 | 31.98907415 | 47.32306836 | 60.96407501 | 59.13481 | −9.557748082 | −0.465 | 4.442 |
| −4.215869872 | 31.12013013 | 47.37611814 | 60.50561091 | 59.8801 | −7.381662876 | −0.594 | 4.383 |
| −5.086937711 | 30.24906229 | 47.44446394 | 60.05550318 | 60.63868 | −5.946418849 | −0.727 | 4.323 |
| −5.960670069 | 29.37532993 | 47.52821067 | 59.61377549 | 61.4111 | −4.928192567 | −0.865 | 4.264 |
| −6.837614221 | 28.49838578 | 47.62748734 | 59.1804789 | 62.19795 | −4.16788442 | −1.009 | 4.204 |
| −7.718325401 | 27.6176746 | 47.7424476 | 58.75569298 | 62.99981 | −3.578195161 | −1.158 | 4.145 |
| −8.60336824 | 26.73263176 | 47.87327024 | 58.33952717 | 63.81729 | −3.107228589 | −1.315 | 4.085 |
| −9.493318243 | 25.84268176 | 48.02015995 | 57.93212214 | 64.65105 | −2.722196928 | −1.479 | 4.026 |
| −10.38876333 | 24.94723667 | 48.18334807 | 57.5336515 | 65.50171 | −2.401367311 | −1.652 | 3.966 |
| −11.29030546 | 24.04569454 | 48.36309351 | 57.14432362 | 66.36995 | −2.129764746 | −1.834 | 3.907 |
| −12.19856228 | 23.13743772 | 48.55968375 | 56.7643836 | 67.25645 | −1.896734811 | −2.028 | 3.847 |
| −13.11416894 | 22.22183106 | 48.77343602 | 56.39411557 | 68.16192 | −1.694490223 | −2.235 | 3.788 |
| −14.03777994 | 21.29822006 | 49.00469855 | 56.03384516 | 69.08707 | −1.517207147 | −2.457 | 3.728 |
| −14.97007113 | 20.36592887 | 49.25385202 | 55.68394216 | 70.03264 | −1.360443026 | −2.697 | 3.669 |
| −15.9117418 | 19.4242582 | 49.52131112 | 55.34482355 | 70.99937 | −1.220749962 | −2.957 | 3.609 |
| −16.86351693 | 18.47248307 | 49.80752632 | 55.01695672 | 71.98802 | −1.095411066 | −3.241 | 3.550 |
| −17.668 | 17.668 | 50.06171064 | 54.75171064 | 72.83244 | −1 | −3.500 | 3.500 |

Table 4 below provides calculated values for the variables shown in Table 2 at a half forward speed input (e.g., 3.5 mph and −3.5 mph full reverse speed).

TABLE 4

| α | $T_{ri}$ | $T_{Ro}$ | $r_i$ | $r_o$ | ω | Axle Ratio | Inside Wheel Speed (MPH) | Outside Wheel Speed (MPH) |
|---|---|---|---|---|---|---|---|---|
| 0 | 8.09698E+17 | 8.1E+17 | 8.1E+17 | 8.1E+17 | 0 | 1 | 3.500 | 3.500 |
| 10 | 280.5480783 | 315.8841 | 283.29 | 321.361 | 8.989355 | 1.125953456 | 3.108 | 3.500 |
| 20 | 135.52738 | 170.8634 | 142.6757 | 179.5442 | 16.40073 | 1.260729603 | 2.776 | 3.500 |
| 30 | 85.16222006 | 120.4982 | 96.855 | 131.9613 | 22.77237 | 1.414925773 | 2.474 | 3.500 |
| 40 | 58.36347819 | 93.69948 | 74.8189 | 107.7026 | 28.49931 | 1.605447124 | 2.180 | 3.500 |
| 50 | 40.87184171 | 76.20784 | 62.4032 | 92.64684 | 33.88195 | 1.864556098 | 1.877 | 3.500 |
| 60 | 27.88907335 | 63.22507 | 54.92815 | 82.11722 | 39.17027 | 2.267019508 | 1.413 | 3.203 |
| 70 | 17.30542362 | 52.64142 | 50.43822 | 74.13037 | 44.60057 | 3.041903208 | 0.955 | 2.905 |
| 71 | 16.33114962 | 51.66715 | 50.11299 | 73.42925 | 45.16093 | 3.163717854 | 0.909 | 2.875 |
| 72 | 15.36851693 | 50.70452 | 49.80753 | 72.74289 | 45.72551 | 3.299245929 | 0.863 | 2.846 |
| 73 | 14.4167418 | 49.75274 | 49.52131 | 72.0707 | 46.2946 | 3.451039249 | 0.816 | 2.816 |
| 74 | 13.47507113 | 48.81107 | 49.25385 | 71.41212 | 46.86848 | 3.622323819 | 0.769 | 2.786 |
| 75 | 12.54277994 | 47.87878 | 49.0047 | 70.76662 | 47.44745 | 3.817238296 | 0.722 | 2.756 |
| 76 | 11.61916894 | 46.95517 | 48.77344 | 70.13371 | 48.03183 | 4.04118136 | 0.675 | 2.727 |
| 77 | 10.70356228 | 46.03956 | 48.55968 | 69.51293 | 48.62192 | 4.301330816 | 0.627 | 2.697 |
| 78 | 9.795305459 | 45.13131 | 48.36309 | 68.90386 | 49.21805 | 4.607442376 | 0.579 | 2.667 |
| 79 | 8.893763333 | 44.22976 | 48.18335 | 68.3061 | 49.82055 | 4.97312124 | 0.530 | 2.637 |
| 80 | 7.998318243 | 43.33432 | 48.02016 | 67.71928 | 50.42976 | 5.417928735 | 0.481 | 2.608 |
| 81 | 7.10836824 | 42.44437 | 47.87327 | 67.14306 | 51.04602 | 5.971042412 | 0.432 | 2.578 |
| 82 | 6.223325401 | 41.55933 | 47.74245 | 66.57712 | 51.6697 | 6.677993311 | 0.382 | 2.548 |
| 83 | 5.342614221 | 40.67861 | 47.62749 | 66.02116 | 52.30117 | 7.613990556 | 0.331 | 2.518 |
| 84 | 4.465670069 | 39.80167 | 47.52821 | 65.47493 | 52.94082 | 8.912810273 | 0.279 | 2.489 |
| 85 | 3.591937711 | 38.92794 | 47.44446 | 64.93818 | 53.58903 | 10.83758708 | 0.227 | 2.459 |
| 86 | 2.720869872 | 38.05687 | 47.37612 | 64.41068 | 54.24621 | 13.98702314 | 0.174 | 2.429 |
| 87 | 1.851925852 | 37.18793 | 47.32307 | 63.89226 | 54.91279 | 20.08067753 | 0.119 | 2.399 |
| 88 | 0.984570167 | 36.32057 | 47.28523 | 63.38272 | 55.58919 | 36.88977321 | 0.064 | 2.370 |
| 89 | 0.11827122 | 35.45427 | 47.26256 | 62.88193 | 56.27587 | 299.7709087 | 0.008 | 2.340 |
| 89.13659 | 4.66294E−15 | 35.336 | 47.26063 | 62.8142 | 56.37049 | 7.57806E+15 | 0.000 | 2.336 |
| 90 | −0.7475 | 34.5885 | 47.255 | 62.38976 | 56.97329 | −46.2722408 | −0.050 | 2.310 |
| 91 | −1.61327122 | 33.72273 | 47.26256 | 61.90611 | 57.68192 | −20.90332261 | −0.109 | 2.281 |
| 92 | −2.479570167 | 32.85643 | 47.28523 | 61.4309 | 58.40226 | −13.25085705 | −0.170 | 2.251 |
| 93 | −3.346925852 | 31.98907 | 47.32307 | 60.96408 | 59.13481 | −9.557748082 | −0.232 | 2.221 |
| 94 | −4.215869872 | 31.12013 | 47.37612 | 60.50561 | 59.8801 | −7.381662876 | −0.297 | 2.191 |
| 95 | −5.086937711 | 30.24906 | 47.44446 | 60.0555 | 60.63868 | −5.946418849 | −0.364 | 2.162 |
| 96 | −5.960670069 | 29.37533 | 47.52821 | 59.61378 | 61.4111 | −4.928192567 | −0.433 | 2.132 |
| 97 | −6.837614221 | 28.49839 | 47.62749 | 59.18048 | 62.19795 | −4.16788442 | −0.504 | 2.102 |
| 98 | −7.718325401 | 27.61767 | 47.74245 | 58.75569 | 62.99981 | −3.578195161 | −0.579 | 2.072 |
| 99 | −8.60336824 | 26.73263 | 47.87327 | 58.33953 | 63.81729 | −3.107228589 | −0.657 | 2.043 |
| 100 | −9.493318243 | 25.84268 | 48.02016 | 57.93212 | 64.65105 | −2.722196928 | −0.739 | 2.013 |
| 101 | −10.38876333 | 24.94724 | 48.18335 | 57.53365 | 65.50171 | −2.401367311 | −0.826 | 1.983 |
| 102 | −11.29030546 | 24.04569 | 48.36309 | 57.14432 | 66.36995 | −2.129764746 | −0.917 | 1.953 |
| 103 | −12.19856228 | 23.13744 | 48.55968 | 56.76438 | 67.25645 | −1.896734811 | −1.014 | 1.924 |
| 104 | −13.11416894 | 22.22183 | 48.77344 | 56.39412 | 68.16192 | −1.694490223 | −1.118 | 1.894 |
| 105 | −14.03777994 | 21.29822 | 49.0047 | 56.03385 | 69.08707 | −1.517207147 | −1.229 | 1.864 |
| 106 | −14.97007113 | 20.36593 | 49.25385 | 55.68394 | 70.03264 | −1.360443026 | −1.348 | 1.834 |
| 107 | −15.9117418 | 19.42426 | 49.52131 | 55.34482 | 70.99937 | −1.220749962 | −1.478 | 1.805 |
| 108 | −16.86351693 | 18.47248 | 49.80753 | 55.01696 | 71.98802 | −1.095411066 | −1.620 | 1.775 |
| 108.8365 | −17.668 | 17.668 | 50.06171 | 54.75171 | 72.83244 | −1 | −1.750 | 1.750 |

Table 5 below provides calculated values for the variables shown in Table 2 at a neutral speed input (e.g., 0 speed forward and 0 speed reverse).

TABLE 5

| α | $T_{ri}$ | $T_{Ro}$ | $r_i$ | $r_o$ | ω | Axle Ratio | Inside Wheel Speed (MPH) | Outside Wheel Speed (MPH) |
|---|---|---|---|---|---|---|---|---|
| 0 | 8.1E+17 | 8.1E+17 | 8.1E+17 | 8.1E+17 | 0 | 1 | 0.000 | 0.000 |
| 10 | 280.5481 | 315.8841 | 283.29 | 321.361 | 8.989355 | 1.12595346 | 0.000 | 0.000 |
| 20 | 13.5274 | 170.8634 | 142.6757 | 179.5442 | 16.40073 | 1.2607296 | 0.000 | 0.000 |
| 30 | 85.16222 | 120.4982 | 96.855 | 131.9613 | 22.77237 | 1.41492577 | 0.000 | 0.000 |
| 40 | 58.36348 | 93.69948 | 74.8189 | 107.7026 | 28.49931 | 1.60544712 | 0.000 | 0.000 |
| 50 | 40.87184 | 76.20784 | 62.4032 | 92.64684 | 33.88195 | 1.8645561 | 0.000 | 0.000 |
| 60 | 27.88907 | 63.22507 | 54.92815 | 82.11722 | 39.17027 | 2.26701951 | 0.000 | 0.000 |
| 70 | 17.30542 | 52.64142 | 50.43822 | 74.13037 | 44.60057 | 3.04190321 | 0.000 | 0.000 |
| 71 | 16.33115 | 51.66715 | 50.11299 | 73.42925 | 45.16093 | 3.16371785 | 0.000 | 0.000 |
| 72 | 15.36852 | 50.70452 | 49.80753 | 72.74289 | 45.72551 | 3.29924593 | 0.000 | 0.000 |

TABLE 5-continued

| α | $T_{ri}$ | $T_{Ro}$ | $r_i$ | $r_o$ | ω | Axle Ratio | Inside Wheel Speed (MPH) | Outside Wheel Speed (MPH) |
|---|---|---|---|---|---|---|---|---|
| 73 | 14.41674 | 49.75274 | 49.52131 | 72.0707 | 46.2946 | 3.45103925 | 0.000 | 0.000 |
| 74 | 13.47507 | 48.81107 | 49.25385 | 71.41212 | 46.86848 | 3.62232382 | 0.000 | 0.000 |
| 75 | 12.54278 | 47.87878 | 49.0047 | 70.76662 | 47.44745 | 3.8172383 | 0.000 | 0.000 |
| 76 | 11.61917 | 46.95517 | 48.77344 | 70.13371 | 48.03183 | 4.04118136 | 0.000 | 0.000 |
| 77 | 10.70356 | 46.03956 | 48.55968 | 69.51293 | 48.62192 | 4.30133082 | 0.000 | 0.000 |
| 78 | 9.795305 | 45.13131 | 48.36309 | 68.90386 | 49.21805 | 4.60744238 | 0.000 | 0.000 |
| 79 | 8.893763 | 44.22976 | 48.18335 | 68.3061 | 49.82055 | 4.97312124 | 0.000 | 0.000 |
| 80 | 7.998318 | 43.33432 | 48.02016 | 67.71928 | 50.42976 | 5.41792874 | 0.000 | 0.000 |
| 81 | 7.108368 | 42.44437 | 47.87327 | 67.14306 | 51.04602 | 5.97104241 | 0.000 | 0.000 |
| 82 | 6.223325 | 41.55933 | 47.74245 | 66.57712 | 51.6697 | 6.67799331 | 0.000 | 0.000 |
| 83 | 5.342614 | 40.67861 | 47.62749 | 66.02116 | 52.30117 | 7.61399056 | 0.000 | 0.000 |
| 84 | 4.46567 | 39.80167 | 47.52821 | 65.47493 | 52.94082 | 8.91281027 | 0.000 | 0.000 |
| 85 | 3.591938 | 38.92794 | 47.44446 | 64.93818 | 53.58903 | 10.8375871 | 0.000 | 0.000 |
| 86 | 2.72087 | 38.05687 | 47.37612 | 64.41068 | 54.24621 | 13.9870231 | 0.000 | 0.000 |
| 87 | 1.851926 | 37.18793 | 47.32307 | 63.89226 | 54.91279 | 20.0806775 | 0.000 | 0.000 |
| 88 | 0.98457 | 36.32057 | 47.28523 | 63.38272 | 55.58919 | 36.8897732 | 0.000 | 0.000 |
| 89 | 0.118271 | 35.45427 | 47.26256 | 62.88193 | 56.27587 | 299.770909 | 0.000 | 0.000 |
| 89.13659 | 4.66E−15 | 35.336 | 47.26063 | 62.8142 | 56.37049 | 7.5781E+15 | 0.000 | 0.000 |
| 90 | −0.7475 | 34.5885 | 47.255 | 62.38976 | 56.97329 | −46.272241 | 0.000 | 0.000 |
| 91 | −1.61327 | 33.72273 | 47.26256 | 61.90611 | 57.68192 | −20.903323 | 0.000 | 0.000 |
| 92 | −2.47957 | 32.85643 | 47.28523 | 61.4309 | 58.40226 | −13.250857 | 0.000 | 0.000 |
| 93 | −3.34693 | 31.98907 | 47.32307 | 60.96408 | 59.13481 | −9.5577481 | 0.000 | 0.000 |
| 94 | −4.21587 | 31.12013 | 47.37612 | 60.50561 | 59.8801 | −7.3816629 | 0.000 | 0.000 |
| 95 | −5.08694 | 30.24906 | 47.44446 | 60.0555 | 60.63868 | −5.9464188 | 0.000 | 0.000 |
| 96 | −5.96067 | 29.37533 | 47.52821 | 59.61378 | 61.4111 | −4.9281926 | 0.000 | 0.000 |
| 97 | −6.83761 | 28.49839 | 47.62749 | 59.18048 | 62.19795 | −4.1678844 | 0.000 | 0.000 |
| 98 | −7.71833 | 27.61767 | 47.74245 | 58.75569 | 62.99981 | −3.5781952 | 0.000 | 0.000 |
| 99 | −8.60337 | 26.73263 | 47.87327 | 58.33953 | 63.81729 | −3.1072286 | 0.000 | 0.000 |
| 100 | −9.49332 | 25.84268 | 48.02016 | 57.93212 | 64.65105 | −2.7221969 | 0.000 | 0.000 |
| 101 | −10.3888 | 24.94724 | 48.18335 | 57.53365 | 65.50171 | −2.4013673 | 0.000 | 0.000 |
| 102 | −11.2903 | 24.04569 | 48.36309 | 57.14432 | 66.36995 | −2.1297647 | 0.000 | 0.000 |
| 103 | −12.1986 | 23.13744 | 48.55968 | 56.76438 | 67.25645 | −1.8967348 | 0.000 | 0.000 |
| 104 | −13.1142 | 22.22183 | 48.77344 | 56.39412 | 68.16192 | −1.6944902 | 0.000 | 0.000 |
| 105 | −14.0378 | 21.29822 | 49.0047 | 56.03385 | 69.08707 | −1.5172071 | 0.000 | 0.000 |
| 106 | −14.9701 | 20.36593 | 49.25385 | 55.68394 | 70.03264 | −1.360443 | 0.000 | 0.000 |
| 107 | −15.9117 | 19.42426 | 49.52131 | 55.34482 | 70.99937 | −1.22075 | 0.000 | 0.000 |
| 108 | −16.8635 | 18.47248 | 49.80753 | 55.01696 | 71.98802 | −1.0954111 | 0.000 | 0.000 |
| 108.8365 | −17.668 | 17.668 | 50.06171 | 54.75171 | 72.83244 | −1 | 0.000 | 0.000 |

Table 6 below provides calculated values for the variables shown in Table 2 at a full reverse speed input (−3.5 mph reverse input).

TABLE 6

| α | $T_{ri}$ | $T_{Ro}$ | $r_i$ | $r_o$ | ω | Axle Ratio | Inside Wheel Speed (MPH) | Outside Wheel Speed (MPH) |
|---|---|---|---|---|---|---|---|---|
| 0 | 8.09698E+17 | 8.1E+17 | 8.1E+17 | 8.1E+17 | 0 | 1 | −3.500 | −3.500 |
| 10 | 280.5480783 | 315.8841 | 283.29 | 321.361 | 8.989355 | 1.12595346 | −3.108 | −3.500 |
| 20 | 135.52738 | 170.8634 | 142.6757 | 179.5442 | 16.40073 | 1.2607296 | −2.776 | −3.500 |
| 30 | 85.16222006 | 120.4982 | 96.855 | 131.9613 | 22.77237 | 1.41492577 | −2.474 | −3.500 |
| 40 | 58.36347810 | 93.69948 | 74.8189 | 107.7026 | 28.49931 | 1.60544712 | −2.180 | −3.500 |
| 50 | 40.87184171 | 76.20784 | 62.4032 | 92.64684 | 33.88195 | 1.8645561 | −1.877 | −3.500 |
| 60 | 27.88907335 | 63.22507 | 54.92815 | 82.11722 | 39.17027 | 2.26701951 | −1.413 | −3.203 |
| 70 | 17.30542362 | 52.64142 | 50.43822 | 74.13037 | 44.60057 | 3.04190321 | −0.955 | −2.905 |
| 71 | 16.33114962 | 51.66715 | 50.11299 | 73.42925 | 45.16093 | 3.16371785 | −0.909 | −2.875 |
| 72 | 15.36851693 | 50.70452 | 49.80753 | 72.74289 | 45.72551 | 3.29924593 | −0.863 | −2.846 |
| 73 | 14.4167418 | 49.75274 | 49.52131 | 72.0707 | 46.2946 | 3.45103925 | −0.816 | −2.816 |
| 74 | 13.47507113 | 48.81107 | 49.25385 | 71.41212 | 46.86848 | 3.62232382 | −0.769 | −2.786 |
| 75 | 12.54277994 | 47.87878 | 49.0047 | 70.76662 | 47.44745 | 3.8172383 | −0.722 | −2.756 |
| 76 | 11.61916894 | 46.95517 | 48.77344 | 70.13371 | 48.03183 | 4.04118136 | −0.675 | −2.727 |
| 77 | 10.70356228 | 46.03956 | 48.55968 | 69.51293 | 48.62192 | 4.30133082 | −0.627 | −2.697 |
| 78 | 9.795305459 | 45.13131 | 48.36309 | 68.90386 | 49.21805 | 4.60744238 | −0.579 | −2.667 |
| 79 | 8.893763333 | 44.22976 | 48.18335 | 68.3061 | 49.82055 | 4.97312124 | −0.530 | −2.637 |
| 80 | 7.998318243 | 43.33432 | 48.02016 | 67.71928 | 50.42976 | 5.41792874 | −0.481 | −2.608 |
| 81 | 7.10836824 | 42.44437 | 47.87327 | 67.14306 | 51.04602 | 5.97104241 | −0.432 | −2.578 |
| 82 | 6.223325401 | 41.55933 | 47.74245 | 66.57712 | 51.6697 | 6.67799331 | −0.382 | −2.548 |
| 83 | 5.342614221 | 40.67861 | 47.62749 | 66.02116 | 52.30117 | 7.61399056 | −0.331 | −2.518 |
| 84 | 4.465670069 | 39.80167 | 47.52821 | 65.47493 | 52.94082 | 8.91281027 | −0.279 | −2.489 |
| 85 | 3.591937711 | 38.92794 | 47.44446 | 64.93818 | 53.58903 | 10.8375871 | −0.227 | −2.459 |
| 86 | 2.720869872 | 38.05687 | 47.37612 | 64.41068 | 54.24621 | 13.9870231 | −0.174 | −2.429 |

TABLE 6-continued

| α | $T_{ri}$ | $T_{Ro}$ | $r_i$ | $r_o$ | ω | Axle Ratio | Inside Wheel Speed (MPH) | Outside Wheel Speed (MPH) |
|---|---|---|---|---|---|---|---|---|
| 87 | 1.851925852 | 37.18793 | 47.32307 | 63.89226 | 54.91279 | 20.0806775 | −0.119 | −2.399 |
| 88 | 0.984570167 | 36.32057 | 47.28523 | 63.38272 | 55.58919 | 36.8897732 | −0.064 | −2.370 |
| 89 | 0.11827122 | 35.45427 | 47.26256 | 62.88193 | 56.27587 | 299.770909 | −0.008 | −2.340 |
| 89.13659 | 4.66294E−15 | 35.336 | 47.26063 | 62.8142 | 56.37049 | 7.5781E+15 | 0.000 | −2.336 |
| 90 | −0.7475 | 34.5885 | 47.255 | 62.38976 | 56.97329 | −46.272241 | 0.050 | −2.310 |
| 91 | −1.61327122 | 33.72273 | 47.26256 | 61.90611 | 57.68192 | −20.903323 | 0.109 | −2.281 |
| 92 | −2.47957017 | 32.85643 | 47.28523 | 61.4309 | 58.40226 | −13.250857 | 0.170 | −2.251 |
| 93 | −3.34692585 | 31.98907 | 47.32307 | 60.96408 | 59.13481 | −9.5577481 | 0.232 | −2.221 |
| 94 | −4.21586987 | 31.12013 | 47.37612 | 60.50561 | 59.8801 | −7.3816629 | 0.297 | −2.191 |
| 95 | −5.08693771 | 30.24906 | 47.44446 | 60.0555 | 60.63868 | −5.9464188 | 0.364 | −2.162 |
| 96 | −5.96067007 | 29.37533 | 47.52821 | 59.61378 | 61.4111 | −4.9281926 | 0.433 | −2.132 |
| 97 | −6.83761422 | 28.49839 | 47.62749 | 59.18048 | 62.19795 | −4.1678844 | 0.504 | −2.102 |
| 98 | −7.7183254 | 27.61767 | 47.74245 | 58.75569 | 62.99981 | −3.5781952 | 0.579 | −2.072 |
| 99 | −8.60336824 | 26.73263 | 47.87327 | 58.33953 | 63.81729 | −3.1072286 | 0.657 | −2.043 |
| 100 | −9.49331824 | 25.84268 | 48.02016 | 57.93212 | 64.65105 | −2.7221969 | 0.739 | −2.013 |
| 101 | −10.3887633 | 24.94724 | 48.18335 | 57.53365 | 65.50171 | −2.4013673 | 0.826 | −1.983 |
| 102 | −11.2903055 | 24.04569 | 48.36309 | 57.14432 | 66.36979 | −2.1297647 | 0.917 | −1.953 |
| 103 | −12.1985623 | 23.13744 | 48.55968 | 56.76438 | 67.25645 | −1.8967348 | 1.014 | −1.924 |
| 104 | −13.1141689 | 22.22183 | 48.77344 | 56.39412 | 68.16192 | −1.6944902 | 1.118 | −1.894 |
| 105 | −14.0377799 | 21.29822 | 49.0047 | 56.03385 | 69.08707 | −1.5172071 | 1.229 | −1.864 |
| 106 | −14.9700711 | 20.36593 | 49.25385 | 55.68394 | 70.03264 | −1.360443 | 1.348 | −1.834 |
| 107 | −15.9117418 | 19.42426 | 49.52131 | 55.34482 | 70.99937 | −1.22075 | 1.478 | −1.805 |
| 108 | −16.8635169 | 18.47248 | 49.80753 | 55.01696 | 71.98802 | −1.0954111 | 1.620 | −1.775 |
| 108.8365 | −17.668 | 17.668 | 50.06171 | 54.75171 | 72.83244 | −1 | 1.750 | −1.750 |

Table 7 below provides calculated values for the variables shown in Table 2 at a half reverse speed input (−1.75 mph reverse input).

TABLE 7

| α | $T_{ri}$ | $T_{Ro}$ | $r_i$ | $r_o$ | ω | Axle Ratio | Inside Wheel Speed (MPH) | Outside Wheel Speed (MPH) |
|---|---|---|---|---|---|---|---|---|
| 0 | 8.09698E+17 | 8.1E+17 | 8.1E+17 | 8.1E+17 | 0 | 1 | −1.750 | −1.750 |
| 10 | 280.5480783 | 315.8841 | 283.29 | 321.361 | 8.989355 | 1.12595346 | −1.554 | −1.750 |
| 20 | 135.52738 | 170.8634 | 142.6757 | 179.5442 | 16.40073 | 1.2607296 | −1.388 | −1.750 |
| 30 | 85.16222006 | 120.4982 | 96.855 | 131.9613 | 22.77237 | 1.41492577 | −1.237 | −1.750 |
| 40 | 58.36347819 | 93.69948 | 74.8189 | 107.7026 | 28.49931 | 1.60544712 | −1.090 | −1.750 |
| 50 | 40.87184170 | 76.20784 | 62.4032 | 92.64684 | 33.88195 | 1.8645561 | −0.939 | −1.750 |
| 60 | 27.88907335 | 63.22507 | 54.92815 | 82.11722 | 39.17027 | 2.26701951 | −0.706 | −1.601 |
| 70 | 17.30542362 | 52.64142 | 50.43822 | 74.13037 | 44.60057 | 3.04190321 | −0.478 | −1.453 |
| 71 | 16.33114962 | 51.66715 | 50.11299 | 73.42925 | 45.16093 | 3.16371785 | −0.454 | −1.438 |
| 72 | 15.36851693 | 50.70452 | 49.80753 | 72.74289 | 45.72551 | 3.29924593 | −0.431 | −1.423 |
| 73 | 14.4167418 | 49.75274 | 49.52131 | 72.0707 | 46.2946 | 3.45103925 | −0.408 | −1.408 |
| 74 | 13.47507113 | 48.81107 | 49.25385 | 71.41212 | 46.86848 | 3.62232382 | −0.385 | −1.393 |
| 75 | 12.54277994 | 47.87878 | 49.0047 | 70.76662 | 47.44745 | 3.8172383 | −0.361 | −1.378 |
| 76 | 11.61916894 | 46.95517 | 48.77344 | 70.13371 | 48.03183 | 4.04118136 | −0.337 | −1.363 |
| 77 | 10.70356228 | 46.03956 | 48.55968 | 69.51293 | 48.62192 | 4.30133082 | −0.313 | −1.348 |
| 78 | 9.795305459 | 45.13131 | 48.36309 | 68.90386 | 49.21805 | 4.60744238 | −0.289 | −1.334 |
| 79 | 8.893763333 | 44.22976 | 48.18335 | 68.3061 | 49.82055 | 4.97312124 | −0.265 | −1.319 |
| 80 | 7.998318243 | 43.33432 | 48.02016 | 67.71928 | 50.42976 | 5.41792874 | −0.241 | −1.304 |
| 81 | 7.10836824 | 42.44437 | 47.87327 | 67.14306 | 51.04602 | 5.97104241 | −0.216 | −1.289 |
| 82 | 6.223325401 | 41.55933 | 47.74245 | 66.57712 | 51.6697 | 6.67799331 | −0.191 | −1.274 |
| 83 | 5.342614221 | 40.67861 | 47.62749 | 66.02116 | 52.30117 | 7.61399056 | −0.165 | −1.259 |
| 84 | 4.465670069 | 39.80167 | 47.52821 | 65.47493 | 52.94082 | 8.91281027 | −0.140 | −1.244 |
| 85 | 3.591937711 | 38.92794 | 47.44446 | 64.93818 | 53.58903 | 10.8375871 | −0.113 | −1.229 |
| 86 | 2.720869872 | 38.05687 | 47.37612 | 64.41068 | 54.24621 | 13.9870231 | −0.087 | −1.215 |
| 87 | 1.851925852 | 37.18793 | 47.32307 | 63.89226 | 54.91279 | 20.0806775 | −0.060 | −1.200 |
| 88 | 0.984570167 | 36.32057 | 47.28523 | 63.38272 | 55.58919 | 36.8897732 | −0.032 | −1.185 |
| 89 | 0.11827122 | 35.45427 | 47.26256 | 62.88193 | 56.27587 | 299.770909 | −0.004 | −1.170 |
| 89.13659 | 4.66294E−15 | 35.336 | 47.26063 | 62.8142 | 56.37049 | 7.5781E+15 | 0.000 | −1.168 |
| 90 | −0.7475 | 34.5885 | 47.255 | 62.38976 | 56.97329 | −46.272241 | 0.025 | −1.155 |
| 91 | −1.61327122 | 33.72273 | 47.26256 | 61.90611 | 57.68192 | −20.903323 | 0.055 | −1.140 |
| 92 | −2.47957017 | 32.85643 | 47.28523 | 61.4309 | 58.40226 | −13.250857 | 0.085 | −1.125 |
| 93 | −3.34692585 | 31.98907 | 47.32307 | 60.96408 | 59.13481 | −9.5577481 | 0.116 | −1.111 |
| 94 | −4.21586987 | 31.12013 | 47.37612 | 60.50561 | 59.8801 | −7.3816629 | 0.148 | −1.096 |
| 95 | −5.08693771 | 30.24906 | 47.44446 | 60.0555 | 60.63868 | −5.9464188 | 0.182 | −1.081 |
| 96 | −5.96067007 | 29.37533 | 47.52821 | 59.61378 | 61.4111 | −4.9281926 | 0.216 | −1.066 |
| 97 | −6.83761422 | 28.49839 | 47.62749 | 59.18048 | 62.19795 | −4.1678844 | 0.252 | −1.051 |
| 98 | −7.7183254 | 27.61767 | 47.74245 | 58.75569 | 62.99981 | −3.5781952 | 0.290 | −1.036 |
| 99 | −8.60336824 | 26.73263 | 47.87327 | 58.33953 | 63.81729 | −3.1072286 | 0.329 | −1.021 |

TABLE 7-continued

| α | $T_{ri}$ | $T_{Ro}$ | $r_i$ | $r_o$ | ω | Axle Ratio | Inside Wheel Speed (MPH) | Outside Wheel Speed (MPH) |
|---|---|---|---|---|---|---|---|---|
| 100 | −9.49331824 | 25.84268 | 48.02016 | 57.93212 | 64.65105 | −2.7221969 | 0.370 | −1.006 |
| 101 | −10.3887633 | 24.94724 | 48.18335 | 57.53365 | 65.50171 | −2.4013673 | 0.413 | −0.992 |
| 102 | −11.2903055 | 24.04569 | 48.36309 | 57.14432 | 66.36995 | −2.1297647 | 0.459 | −0.977 |
| 103 | −12.1985623 | 23.13744 | 48.55968 | 56.76438 | 67.25645 | −1.8967348 | 0.507 | −0.962 |
| 104 | −13.1141689 | 22.22183 | 48.77344 | 56.39412 | 68.16192 | −1.6944902 | 0.559 | −0.947 |
| 105 | −14.0377799 | 21.29822 | 49.0047 | 56.03385 | 69.08707 | −1.5172071 | 0.614 | −0.932 |
| 106 | −14.9700711 | 20.36593 | 49.25385 | 55.68394 | 70.03264 | −1.360443 | 0.674 | −0.917 |
| 107 | −15.9117418 | 19.42426 | 49.52131 | 55.34482 | 70.99937 | −1.22075 | 0.739 | −0.902 |
| 108 | −16.8635169 | 18.47248 | 49.80753 | 55.01696 | 71.98802 | −1.0954111 | 0.810 | −0.887 |
| 108.8365 | −17.668 | 17.668 | 50.06171 | 54.75171 | 72.83244 | −1 | 0.875 | −0.875 |

As illustrated above, the rotational speed of the inside wheel and the outside wheel (which is provided in terms of magnitude and direction) can be varied based on the angle of the steerable wheels 20, 25 and the speed input to the drivable wheels 30, 35.

As those of ordinary skill in the art will understand, embodiments of control unit 140 that are configured for use with a vehicle with two steerable front wheels and two drivable rear wheels (which is one example of a vehicle with one or more steerable structures and one or more drivable structures) can be programmed based on information in Tables 1-7 above so that it can output signals for controlling the drive units to which it is coupled.

Those of ordinary skill in the art, having the benefit of this disclosure, will understand that other embodiments of the present control units may be programmed in a similar manner for other vehicle configurations. For example, embodiments of the present control units that are configured for use with a vehicle having one steerable wheel and two drivable wheels (e.g., one steerable front wheel 223 and two drivable rear wheels 230 and 235, as shown schematically in FIG. 15) can be programmed based on information in the following tables.

Figure 15:
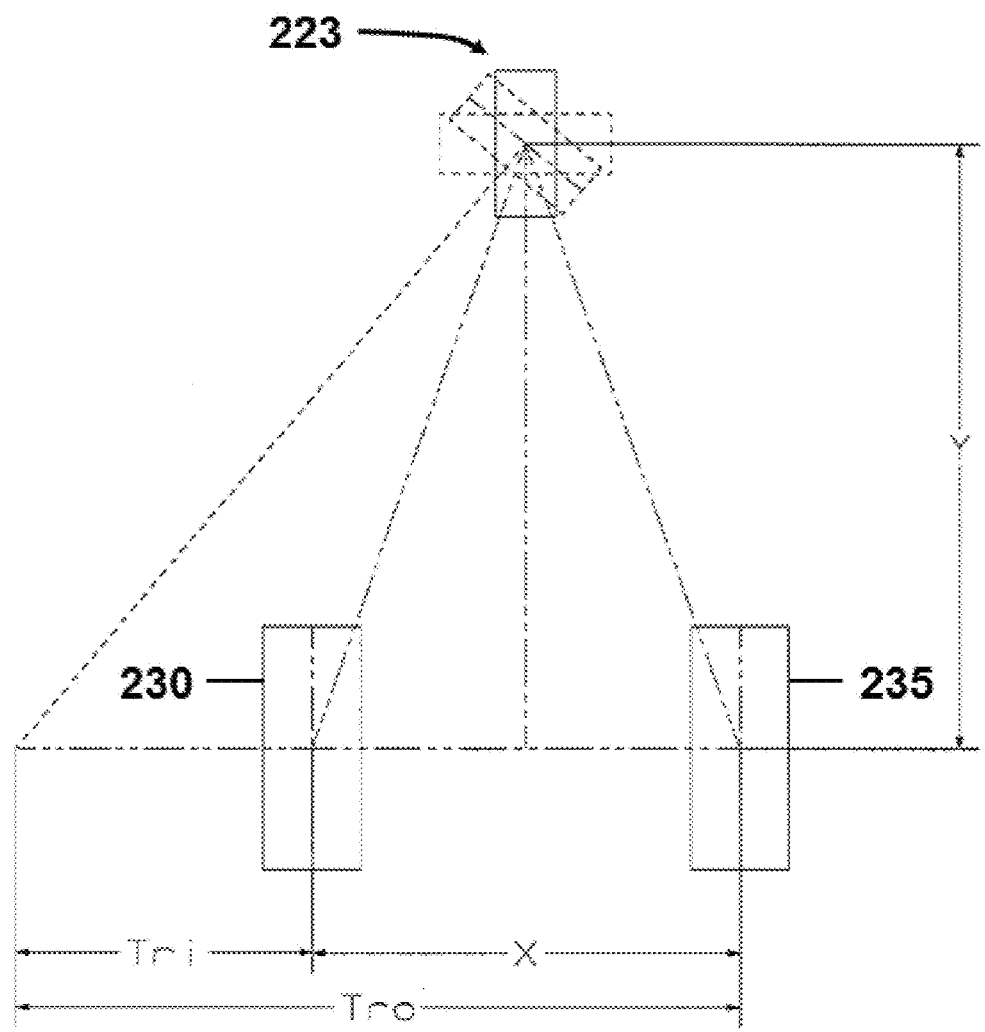
FIG. 15 schematically shows an embodiment that has one steerable wheel and two drivable wheels.

Table 8 below provides equations used to calculate or measure the variables addressed in Tables 9-10, some of which are shown in FIG. 15.

TABLE 8

Equations:

$o_{rear} = (x − z)/2$
$T_{Ri} = \tan(90° − α) \cdot y − o_{rear}$
$T_{Ro} = T_{Ri} + x$
$r_i = \mathrm{SQRT}(y^2 + (T_{Ri} + o_{rear})^2) − o_{front}$
$r_o = \mathrm{SQRT}(y^2 + (T_{Ro} − o_{rear})^2) + o_{front}$
Axle Ratio = $T_{Ro}/T_{Ri}$
$α_{u-turn} = 90 − \tan^{-1}(o_{rear}/y)$
$α_{zero-turn} = 90 − \tan^{-1}((−x/2 + o_{rear})/y)$
$\mathrm{MPH}_{inside}$ = Outside Wheel Speed/Axle Ratio
$\mathrm{MPH}_{outside} =$
$\mathrm{Full}_{FWD} − ((\mathrm{Full}_{FWD}/2)/(α_{zero-turn} − α_{slowdown})) \cdot (α_{current} − α_{slow\ down})$ Table 9 below provides the nomenclature for the variables used in the equations of Table 8 and/or Table 10.

TABLE 9

Nomenclature:

x = Wheel Base (rear)
z = Wheel base (front) (EQUALS ZERO FOR 3 WHEELER)
y = Track Width
$o_{rear}$ = rear wheel offset
α = Steering angle inside front (°)
$T_{Ri}$ = Turning radius inside rear
$T_{Ro}$ = Turning radius outside rear
$α_{u-turn}$ = Front wheel angle @ a U Turn
$α_{zero-turn}$ = Front wheel angle @ a Zero Turn
$\mathrm{MPH}_{inside}$ = Inside Rear Wheel Speed
$\mathrm{MPH}_{outside}$ = Outside rear Wheel Speed
$α_{current}$ = Current Frontwheel angle (for calculation)
$α_{slowdown}$ = Front Wheel Angle at the point of outside wheel speed slow down Table 10 below provides calculated values for some of the variables shown in Table 9 at a full forward speed input, where:

| x | y | $o_{rear}$ | U-Turn (α) | Zero-Turn (α) | Full Fwd Speed (MPH) | Full Reverse Speed (MPH) |
|---|---|---|---|---|---|---|
| 35.336 | 49.6 | 17.668 | 70.39360888 | 90 | 7 | −3.5 |

Unless otherwise specified, in Table 10 and the chart in the preceding paragraph, distance values are expressed in inches, angle values are expressed in degrees, and speed values are expressed in miles per hour. Note that, in a preferred embodiment of the present control units configured for use with a riding lawn tractor having the wheel base configuration shown in FIG. 15, the control unit can be programmed so that the outside wheel maintains the same speed until the steered angle of the steerable wheel is at least fifty degrees in order to reduce turfing.

TABLE 10

| α | $T_{ri}$ | $T_{ro}$ | Axle Ratio | Inside Wheel Speed (MPH) | Outside Wheel Speed (MPH) |
|---|---|---|---|---|---|
| 0 | 8.09698E+17 | 8.1E+17 | 1 | 7.000 | 7.000 |
| 10 | 263.6275783 | 298.9636 | 1.13403757 | 6.173 | 7.000 |
| 20 | 118.60688 | 153.9429 | 1.297925382 | 5.393 | 7.000 |
| 30 | 68.24172006 | 103.5777 | 1.517806409 | 4.612 | 7.000 |
| 40 | 41.44297819 | 76.77898 | 1.852641425 | 3.778 | 7.000 |

TABLE 10-continued

| α | $T_{ri}$ | $T_{ro}$ | Axle Ratio | Inside Wheel Speed (MPH) | Outside Wheel Speed (MPH) |
|---|---|---|---|---|---|
| 50 | 23.95134171 | 59.28734 | 2.475324449 | 2.828 | 7.000 |
| 60 | 10.96857335 | 46.30457 | 4.221567552 | 1.658 | 7.000 |
| 70 | 0.38492362 | 35.72092 | 92.80003045 | 0.063 | 5.833 |
| 70.39361 | 0 | 35.336 | approaches infinity | approaches infinity | 5.216 |
| 71 | −0.58935038 | 34.74665 | −58.95754164 | −0.088 | 5.163 |
| 72 | −1.55198307 | 33.78402 | −21.76828965 | −0.233 | 5.075 |
| 73 | −2.5037582 | 32.83224 | −13.11318393 | −0.380 | 4.988 |
| 74 | −3.44542887 | 31.89057 | −9.255907572 | −0.529 | 4.900 |
| 75 | −4.37772006 | 30.95828 | −7.071781556 | −0.681 | 4.813 |
| 76 | −5.30133106 | 30.03467 | −5.665495817 | −0.834 | 4.725 |
| 77 | −6.21693772 | 29.11906 | −4.683827246 | −0.990 | 4.638 |
| 78 | −7.12519454 | 28.21081 | −3.959303188 | −1.149 | 4.550 |
| 79 | −8.02673667 | 27.30926 | −3.402287189 | −1.312 | 4.463 |
| 80 | −8.92218176 | 26.41382 | −2.960466281 | −1.478 | 4.375 |
| 81 | −9.81213176 | 25.52387 | −2.601256166 | −1.648 | 4.288 |
| 82 | −10.6971746 | 24.63883 | −2.303302164 | −1.823 | 4.200 |
| 83 | −11.5778858 | 23.75811 | −2.052025272 | −2.004 | 4.113 |
| 84 | −12.4548299 | 22.88117 | −1.837132277 | −2.191 | 4.025 |
| 85 | −13.3285623 | 22.00744 | −1.651148656 | −2.385 | 3.938 |
| 86 | −14.1996301 | 21.13637 | −1.488515523 | −2.586 | 3.850 |
| 87 | −15.0685741 | 20.26743 | −1.34501285 | −2.797 | 3.763 |
| 88 | −15.9359298 | 19.40007 | −1.217379241 | −3.019 | 3.675 |
| 89 | −16.8022288 | 18.53377 | −1.103054331 | −3.252 | 3.588 |
| 90 | −17.668 | 17.668 | −1 | −3.500 | 3.500 |

In some embodiments, vehicle 10 can comprise one or more solar panels (e.g., forming and/or coupled to a roof over the seat or other portion of the vehicle on which a user or operator may be disposed during operation of the vehicle). Such solar panels may be coupled and/or configured to be coupled to the battery source 150 (e.g., and/or individual batteries) via any appropriate circuitry or other connection.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, while particular brackets and or linkages are shown to locate sensors in close proximity to magnets, it is understood that other location apparatus and configurations may be utilized.

As another example, while vehicles with structures that are either steerable or drivable have been shown and discussed, other examples of vehicles having one or more steerable structures and one or more drivable structures are those having structures (e.g., wheels) that are both steerable and drivable, including, for example, 4-wheeled vehicles and 3-wheeled vehicles.

As another example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A control system for a vehicle capable of making a small radius turn that has steerable wheels and drivable wheels, the control system comprising:
 a steered wheel position sensor coupled to one of the steerable wheels and configured to generate a signal corresponding to the actual position of such steerable wheel, regardless of a commanded position of such steerable wheel;
 a speed input sensor configured to generate a signal representative of a commanded speed input; and
 a control unit coupled to the steered wheel position sensor and the speed input sensor, the control unit being configured to generate signals for controlling the drivable wheels as a function of at least: the signal corresponding to the actual position of the steerable wheel to which the steered wheel position sensor is coupled, the signal representative of the commanded speed input, a wheel base of the steerable wheels, a wheel base of the drivable wheels, a track width, any steerable wheel offset, and any drivable wheel offset.

2. The control system of claim 1, where the control unit is coupled to each drivable wheel through a separate electric drive motor.

3. The control system of claim 1, where the control unit is coupled to each drivable wheel through a separate hydrostatic transmission.

4. The control system of claim 1, where the control unit is configured to, during an extreme turn, reduce the speed of the drivable wheel positioned on an outboard side of the extreme turn at least when an operator commands a full forward speed input.

5. The control system of claim 1, where the control unit is configured to generate signals for controlling the drivable wheels that, together with the steering assembly, are capable of driving the vehicle in a substantially zero-radius turn.

6. A vehicle having steerable wheels and one or more drivable structures, comprising:
   a steering assembly comprising:
      a steering input member capable of receiving a commanded steering input;
      a steered wheel position sensor coupled to one of the steerable wheels and configured to generate a signal corresponding to the actual position of such steerable wheel, regardless of the commanded steering input;
   a speed input device;
   a speed input sensor configured to generate a signal representative of a commanded speed input;
   one or more drive units respectively coupled to the one or more drivable structures; and
   a control unit coupled to the steered wheel position sensor, the speed input sensor, and the one or more drive units, the control unit being configured to generate signals for controlling the one or more drive units as a function of at least: the signal corresponding to the actual position of the steerable wheel to which the steered wheel position sensor is coupled, the signal representative of the commanded speed input, a wheel base of the steerable wheels, a track width, any steerable wheel offset, and any drivable structure offset.

7. The vehicle claim 6, where the speed input device comprises a forward pedal and a reverse pedal, the vehicle also comprises a shaft to which the forward and reverse pedals are coupled, and the speed input sensor is coupled to the shaft and configured to generate a signal representative of an actual position of the shaft.

8. The vehicle of claim 6, where the one or more drivable structures are drivable wheels, and the control unit is configured to, during an extreme turn, reduce the speed of the drivable wheel positioned on an outboard side of the extreme turn at least when the speed input device has been moved to a full forward position.

9. The vehicle of claim 6, where the control unit is configured to generate signals for controlling the one or more drivable structures that, together with the steering assembly, are capable of driving the vehicle in a substantially zero-radius turn.

10. A control system for a vehicle having steerable wheels and one or more drivable structures, the control system comprising:
   a steered wheel position sensor coupled to one of the steerable wheels and configured to generate a signal corresponding to the actual position of such steerable wheel, regardless of a commanded position of such steerable wheel;
   a speed input sensor configured to generate a signal representative of a commanded speed input; and
   a control unit coupled to the steered wheel position sensor and the speed input sensor, the control unit being configured to generate signals for controlling the one or more drivable structures as a function of at least: the signal corresponding to the actual position of the steerable wheel to which the steered wheel position sensor is coupled, the signal representative of the commanded speed input, a wheel base of the steerable wheels, a track width, any steerable wheel offset, and any drivable structure offset.

11. The control system of claim 10, where the control unit is coupled to each drivable structure through a separate electric drive motor.

12. The control system of claim 10, where the speed input sensor is coupled to a foot pedal.

13. The control system of claim 10, where the speed input sensor is configured to generate a signal representative of a commanded speed input and indicative of both a speed and a direction.

14. The control system of claim 10, where the control unit is coupled to each drivable wheel through a separate hydrostatic transmission.

15. The control system of claim 14, where the one or more drivable structures are drivable wheels, and the control unit is configured to, during an extreme turn, reduce the speed of the drivable wheel positioned on an outboard side of the extreme turn at least when an operator commands a full forward speed input.

16. The control system of claim 10, where the one or more drivable structures are drivable wheels, and the control unit is configured to generate signals for controlling the drivable wheels that, together with a steering assembly, are capable of driving the vehicle in a substantially zero-radius turn.

17. The control system of claim 10, where the steerable wheels comprise left and right steerable wheels, the control system further comprising:
   a steering assembly coupled to the left and right steerable wheels and including the steered wheel position sensor, the steering assembly also including:
      a steering input gear coupled to a steering input member;
      two geared members engaged with the steering input gear and pivotable in response to turning of the steering input gear;
      a left drivable gear coupled to one of the two geared members through a left linkage and engaged with a left driven gear, the left driven gear being coupled to the left steerable wheel such that the left steerable wheel rotates with the left driven gear; and
      a right drivable gear coupled to the other of the two geared members through a right linkage and engaged with a right driven gear, the right driven gear being coupled to the right steerable wheel such that the right steerable wheel rotates with the right driven gear;
      the steered wheel position sensor being coupled to one of the left steerable wheel and the right steerable wheel and configured to generate a signal corresponding to the actual position of such steerable wheel.

18. A vehicle having non-wheel steerable structures and one or more drivable structures, comprising:
   a steering assembly comprising:
      a steering input member capable of receiving a commanded steering input;
      a steered non-wheel structure position sensor coupled to one of the non-wheel steerable structures and configured to generate a signal corresponding to the actual position of such non-wheel steerable structure, regardless of the commanded steering input;
   a speed input device;
   a speed input sensor configured to generate a signal representative of a commanded speed input;
   one or more drive units respectively coupled to the one or more drivable structures; and
   a control unit coupled to the steered wheel position sensor, the speed input sensor, and the one or more drive units, the control unit being configured to generate signals for controlling the one or more drive units as a function of at least: the signal corresponding to the actual position of the steerable non-wheel structure to which the steered non-wheel structure position sensor is coupled, and the signal representative of the commanded speed input, a base of the non-wheel steerable structures, a track width, any non-wheel steerable structure offset, and any drivable structure offset.

19. The vehicle claim 18, where the speed input device comprises a forward pedal and a reverse pedal, the vehicle also comprises a shaft to which the forward and reverse pedals are coupled, and the speed input sensor is coupled to the shaft and configured to generate a signal representative of an actual position of the shaft.

20. The vehicle of claim 18, where the control unit is configured to generate signals for controlling the one or more drivable structures that, together with the steering assembly, are capable of driving the vehicle in a substantially zero-radius turn.

* * * * *